US008713126B2

(12) United States Patent
Togashi et al.

(10) Patent No.: US 8,713,126 B2
(45) Date of Patent: Apr. 29, 2014

(54) INFORMATION-PROVISION CONTROL METHOD, INFORMATION REPRODUCTION SYSTEM, INFORMATION-PROVISION APPARATUS, INFORMATION REPRODUCTION APPARATUS AND INFORMATION-PRESENTATION CONTROL PROGRAM

(75) Inventors: Ryuichiro Togashi, Tokyo (JP); Shigetaka Kudo, Kanagawa (JP); Yasuhiko Otani, Tokyo (JP)

(73) Assignee: Sony Corporation, Tokyo (JP)

( * ) Notice: Subject to any disclaimer, the term of this patent is extended or adjusted under 35 U.S.C. 154(b) by 1518 days.

(21) Appl. No.: 11/068,068

(22) Filed: Feb. 28, 2005

(65) Prior Publication Data

US 2005/0235334 A1 Oct. 20, 2005

(30) Foreign Application Priority Data

Mar. 4, 2004 (JP) ................. P2004-060561

(51) Int. Cl.
*G06F 15/167* (2006.01)
*G06F 15/16* (2006.01)
*H04N 7/18* (2006.01)

(52) U.S. Cl.
USPC ............... 709/213; 709/203; 725/81; 725/82

(58) Field of Classification Search
USPC .......................................................... 709/217
See application file for complete search history.

(56) References Cited

U.S. PATENT DOCUMENTS

| 6,697,944 | B1 * | 2/2004 | Jones et al. | 713/168 |
|---|---|---|---|---|
| 6,760,443 | B2 * | 7/2004 | Lacy et al. | 380/269 |
| 7,113,983 | B1 * | 9/2006 | Terada et al. | 709/219 |
| 7,184,755 | B2 * | 2/2007 | Fukushima | 455/414.3 |
| 7,228,568 | B2 * | 6/2007 | Abe et al. | 726/31 |
| 2002/0174269 | A1 * | 11/2002 | Spurgat et al. | 710/1 |
| 2003/0023757 | A1 * | 1/2003 | Ishioka et al. | 709/246 |
| 2003/0227833 | A1 * | 12/2003 | Nonaka et al. | 369/30.07 |
| 2004/0228350 | A1 * | 11/2004 | Kuroda et al. | 370/395.4 |

FOREIGN PATENT DOCUMENTS

| JP | 59-108156 | 6/1984 |
|---|---|---|
| JP | 10-164449 | 6/1998 |
| JP | 2003-018482 A | 1/2003 |
| JP | 2003-018576 A | 1/2003 |
| JP | 2003-318916 A | 11/2003 |
| JP | 2004-336310 A | 11/2004 |
| JP | 2004-343445 A | 12/2004 |
| WO | WO 03/073344 A2 | 9/2003 |

\* cited by examiner

*Primary Examiner* — Rupal Dharia
*Assistant Examiner* — Joe Chacko
(74) *Attorney, Agent, or Firm* — Wolf, Greenfield & Sacks, P.C.

(57) ABSTRACT

When the information-provision apparatus is providing an audio signal to the specific information reproduction apparatus, the user enters an operation input to the specific information reproduction apparatus to switch processing to reproduce an audio content from the specific information reproduction apparatus to another information reproduction apparatus. In this case, the specific information reproduction apparatus requests the information-provision apparatus to start an operation of providing the audio content to the other information reproduction apparatus specified in the operation input as an apparatus to newly reproduce the audio content. Then, the specific information reproduction apparatus requests the information-provision apparatus to end an operation of providing the audio content to the specific information reproduction apparatus specified in the operation input as an apparatus to terminate an operation of reproducing the audio content.

11 Claims, 15 Drawing Sheets

F I G. 1 6

| | NEWLY DESIGNATED APPARATUS IN SWITCHING | MAC ADDRESS | SWITCHING TIME | FADE-IN /OUT Frag |
|---|---|---|---|---|
| PREVIOUS SETTING | APPARATUS B | 0000 **** **** | 30 SECONDS | 1 |
| USER SETTING 1 | APPARATUS C | 0000 **** **** | 60 SECONDS | 1 |
| USER SETTING 2 | APPARATUS B | 0000 **** **** | 30 SECONDS | 0 |
| ... | APPARATUS C | 0000 **** **** | 30 SECONDS | 0 |
| ... | ... | ... | ... | ... |

551a, 551b, 551b, 552, 553, 554, 555

INFORMATION-PROVISION CONTROL METHOD, INFORMATION REPRODUCTION SYSTEM, INFORMATION-PROVISION APPARATUS, INFORMATION REPRODUCTION APPARATUS AND INFORMATION-PRESENTATION CONTROL PROGRAM

BACKGROUND OF THE INVENTION

The present invention relates to an information-provision control method adopted in an information reproduction system including at least one information-provision apparatus and a plurality of information reproduction apparatuses used for sequentially reproducing information provided by the information-provision apparatus, as well as relates to this information reproduction system, the information-provision apparatus, the information reproduction apparatus and an information-provision control program.

In recent years, with popularization of personal computers and the increasing number of applications of the Internet, by using a personal computer at a home or at a working place, a large number of accesses to a server connected to the Internet can be made to download a variety of content data and a large number of emails can be exchanged in a wide range of applications. In addition, the operations to download audio and video data from a server as content data by way of the Internet have been becoming regular day-to-day operations. For example, a technology has been proposed for an Internet-based chat system as a technology allowing audio data to be provided at the same time to a plurality of persons participating in a chat to be listened to by the participants in the same way as text data. For details of this technology, refer to Japanese Patent Laid-open No. 2001-184292, which is referred to as patent reference 1.

In this way, through the so-called WAN (Wide Area Network), communication technologies have been dramatically making progress to provide the user with a convenient application environment as evidenced by, among others, the fact that necessary information can be acquired in a short period of time at places such as a home and a working place whereas information can be exchanged smoothly as advancements of efforts to share information.

Moreover, in addition to the WAN system, a LAN (Local Area Network) system can be constructed as a network connecting personal computers and peripheral apparatus to each other in a limited space such as a home or rooms inside a building. The LAN system is widely used as a system for allowing users to share resources such as files and a printer.

In the conventional LAN system employing UARTs (Universal Asynchronous Receiver-Transceivers), however, a sufficiently high communication speed cannot be assured, raising a problem that, for example, it takes too long time to exchange audio data that should be transmitted at a required communication speed of about 1.4 MBps (megabytes per second).

In addition, with recent introduction of a USB (Universal Serial Bus), a personal computer becomes capable of transmitting audio data by way of a USB terminal. Nevertheless, the maximum length of its cable is fixed at 5 m. Thus, for example, even a personal computer located in the same room is not capable of playing the role of an active speaker.

With progress made in recent years in Internet technologies, however, communication using a TCP/IP (Transmission Control Protocol/Internet Protocol), which has been becoming popular, not only allows audio data to be transferred in a sufficiently short period of time given its communication speed and communication reliability, but also allows the length of a cable used in a LAN system built at a place like a home to be extended to a maximum of 100 m. Thus, sounds of music can distributed to any locations in the facility. In addition, through a piece of equipment such as a Network HUB, the number of apparatus connectable to the network can be increased.

On the top of that, if only audio data is to be transferred through a given communication band, a plurality of pieces of audio data can be transmitted once simultaneously. Thus, by providing a server having a sufficient processing power, it is possible to prepare an environment in which clients installed in a plurality of rooms are capable of listening to desired audio data being distributed at the same time from the server.

Accordingly, a personal computer installed at a home and a variety of AV (Audio/Visual) apparatus provided in rooms of the home can be connected to each other through a LAN. With such a LAN, it is possible to build an environment in which contents stored in the personal computer can be enjoyed at a variety of places such as the living room, study room and bedroom of the home. Examples of the contents are audio data, video data and AV data, which includes audio and video data collected synchronously.

Much like a WAN system, a LAN system also adopts a general method of utilization by which any client desiring information outputs a request for the information to a server used as an information provider and the server transmits the desired information to the server in response to the request. If the LAN system adopting such a method includes a plurality of clients, the clients are allowed to make accesses to the server simultaneously to receive a desired content at the same time.

By the way, the so-called home network system, which is a LAN system constructed at a home, is built in a house. Given such a home network system, the user raises a demand for a capability of enjoying a desired content in a room in which the user desires to enjoy the content. In this case, the user issues a request to typically a personal computer functioning as a server through an AV apparatus located in the room.

In addition, the user also raises a demand for a capability of allowing the user not to only listen to a desired audio content in a specific room through a particular AV apparatus, but also to continuously listen to the same audio content in another room through another AV apparatus located at the other room following a movement of the user from the specific room to the other room. On the top of that, in this case, it is desirable to merely require the user to operate only once either the particular AV apparatus in the specific room immediately before the movement or the other AV apparatus in the other room after the movement.

In the conventional home network system, however, as general operations to be carried out by the user on a particular AV apparatus in a specific room to make an access to the server to search the server for a desired content and control an operation to reproduce the content, normally, the user is capable of operating the particular AV apparatus presumably only for the purpose of reproducing the desired content in this AV apparatus. Thus, when the user moves from the specific room to another room after operating the particular AV apparatus, the user must stop the operation carried out by the particular AV apparatus to reproduce the content before the user moves from the specific room to the other room and then operate another AV apparatus installed in the other room in order to restart the operation to reproduce the desired content. Thus, from the user point of view, the operatability of the conventional home network system is poor and the operation to reproduce a content is interrupted every time the user moves from one room to another. That is to say, it is difficult to reproduce a content continuously.

SUMMARY OF THE INVENTION

It is thus an object of the present invention, which addresses the problems described above, to provide an information-provision control method capable of switching an operation to reproduce a content from one reproduction apparatus to another one in a simple operation carried out by the user without interrupting the operation to reproduce the content.

In addition, it is another object of the present invention to provide an information reproduction system capable of switching an operation to reproduce a content from one reproduction apparatus to another one in a simple operation carried out by the user without interrupting the operation to reproduce the content as well as provide an information-provision apparatus and information reproduction apparatus to be included in the information reproduction system.

On the top of that, it is a further object of the present invention to provide an information-provision control program capable of switching an operation to reproduce a content from one reproduction apparatus to another one in a simple operation carried out by the user without interrupting the operation to reproduce the content.

According to a first aspect of the present invention, there is provided an information control method adopted in an information reproduction system including at least one information-provision apparatus and a plurality of information reproduction apparatuses each used for reproducing information received from said information-provision apparatus, said information control method including the steps of:

letting one of said information reproduction apparatus request said information-provision apparatus to transmit predetermined content data to a specific one of said information reproduction apparatus by transmitting pieces of information to said information-provision apparatus as content identification information used for identifying said predetermined content data and apparatus identification information used for designating said specific information reproduction apparatus as an information reproduction apparatus to receive said predetermined content data transmitted by said information-provision apparatus;

letting said information-provision apparatus transmit said predetermined content data to said specific information reproduction apparatus;

letting said specific information reproduction apparatus reproduce said predetermined content data;

requesting said information-provision apparatus to transmit said predetermined content data to a particular one of said information reproduction apparatus by transmitting apparatus identification information to said information-provision apparatus as information used for designating said particular information reproduction apparatus as an information reproduction apparatus to newly receive said predetermined content data transmitted by said information-provision apparatus wherein said particular information reproduction apparatus is different from said specific information reproduction apparatus;

letting said information-provision apparatus start transmitting said predetermined content data to said particular information reproduction apparatus; and letting said particular information reproduction apparatus reproduce said predetermined content data in a continuation operation to reproduce said predetermined content data.

According to a second aspect of the present invention, there is provided an information reproduction system including at least one information-provision apparatus and a plurality of information reproduction apparatuses each used for reproducing information received from said information-provision apparatus wherein said information-provision apparatus includes:
  a presentation-request acceptance section for accepting a request to start an operation of providing content data to any specific one of said information reproduction apparatus;
  an information-providing section for carrying out said operation to provide content data to said specific information reproduction apparatus in accordance with said request; and
  a content-recipient modification section for changing any ones of said information reproduction apparatus each designated as a recipient of said content data, whereas
said information reproduction apparatus includes:
  a reproduction section for reproducing content data; and
  a recipient designation section for requesting said information-provision apparatus to transmit predetermined content data to any specific one of said information reproduction apparatus by transmitting pieces of information to said information-provision apparatus as content identification information used for identifying said predetermined content data and apparatus identification information used for designating said specific information reproduction apparatus as an information reproduction apparatus to receive said predetermined content data as well as requesting said information-provision apparatus to transmit said predetermined content data to a particular one of said information reproduction apparatus by transmitting apparatus identification information to said information-provision apparatus as information used for designating said particular information reproduction apparatus as an information reproduction apparatus to newly receive said predetermined content data wherein said particular information reproduction apparatus is different from said specific information reproduction apparatus.

According to a third aspect of the present invention, there is provided an information-provision apparatus for providing content data to a plurality of information reproduction apparatuses each used for reproducing said content data received from said information-provision apparatus, said information-provision apparatus including:
  a presentation-request acceptance section for accepting a request to start an operation to provide content data to any specific one of said information reproduction apparatus;
  an information-providing section for carrying out said operation to provide content data to said specific information reproduction apparatus in accordance with said request; and
  a content-recipient modification section for changing any ones of said information reproduction apparatus each designated as a recipient of said content data.

According to a fourth aspect of the present invention, there is provided an information reproduction apparatus for reproducing content data received from an information-provision apparatus, said information reproduction apparatus including:
  a reproduction section for reproducing content data; and
  a recipient designation section for requesting said information-provision apparatus to transmit predetermined content data to a specific information reproduction apparatus by transmitting pieces of information to said information-provision apparatus as content identification information used for identifying said predetermined content data and apparatus identification information used for designating said specific information reproduction apparatus as an information reproduction apparatus to receive said predetermined content data as well as requesting said information-provision apparatus to transmit said predetermined content data to another information reproduction apparatus by transmitting apparatus identification information to said information-provision apparatus as information used for designating said other information reproduction apparatus as an information reproduction apparatus to newly receive said predetermined content data.

According to a fifth aspect of the present invention, there is provided an information control program to be executed by a computer carrying out a process to control operations of reproducing information provided by at least an information-provision apparatus in a plurality of information reproduction apparatuses each used for reproducing said information, said information control program including the steps of:

letting one of said information reproduction apparatus request said information-provision apparatus to transmit predetermined content data to a specific one of said information reproduction apparatus by transmitting pieces of information to said information-provision apparatus as content identification information used for identifying said predetermined content data and apparatus identification information used for designating said specific information reproduction apparatus as an information reproduction apparatus to receive said predetermined content data transmitted by said information-provision apparatus;

letting said information-provision apparatus transmit said predetermined content data to said specific information reproduction apparatus;

letting said specific information reproduction apparatus reproduce said predetermined content data;

requesting said information-provision apparatus to transmit said predetermined content data to a particular one of said information reproduction apparatus by transmitting apparatus identification information to said information-provision apparatus as information used for designating said particular information reproduction apparatus as an information reproduction apparatus to receive said predetermined content data transmitted by said information-provision apparatus wherein said particular information reproduction apparatus is different from said specific information reproduction apparatus;

letting said information-provision apparatus start transmitting said predetermined content data to said particular information reproduction apparatus; and letting said particular information reproduction apparatus reproduce said predetermined content data in a continuation operation to reproduce said predetermined content data.

In accordance with the present invention, when any of the information-provision apparatus is providing the same information-conveying signal to at least one of the information reproduction apparatus at the same time, by providing one of the information reproduction apparatus with input specification information designating at least one of the information reproduction apparatus employed in the information reproduction system as new presentation targets of the information-conveying signal and designating at least one of the information reproduction apparatus as information-conveying signal recipients to be subjected to termination of an operation to provide the information-conveying signal to the information-conveying signal recipients, the same information-conveying signal can be transmitted to the information reproduction apparatus each designated as the new presentation target, and the information reproduction apparatus serving as the new presentation targets are each capable of reproducing the information-conveying signal. In addition, the operation to provide the information-conveying signal to the information reproduction apparatus each designated as the information-conveying signal recipient to be subjected to termination of an operation to provide the information-conveying signal is terminated to end the operations carried out by these information-conveying signal recipients to reproduce the information-conveying signal. Thus, with a simple operation carried by the user, the same information-conveying signal can be switched from one information reproduction apparatus to another without interrupting the operation to reproduce the information-conveying signal.

In addition, if one of the information reproduction apparatus each designated by the input specification information as the new presentation target or one of the information reproduction apparatus each designated by the input specification information as the information-conveying signal recipient to be subjected to termination of an operation to provide the information-conveying signal is selected as the information reproduction apparatus to receive the input specification information, when the user moves from a specific room to another room, the user is capable of switching the same information-conveying signal from one information reproduction apparatus installed in the specific room to another one installed in the other room by operating only one information reproduction apparatus actually reproducing the information-conveying signal in the specific or other room. Thus, convenience offered to the user is enhanced.

BRIEF DESCRIPTION OF THE DRAWINGS

FIG. 16 shows a typical table used by an audio reproduction apparatus specified as a switching object to end an operation of reproducing an audio content as a table showing audio reproduction apparatus each to be newly designated as a switching object to start an operation of reproducing the audio content.

DETAILED DESCRIPTION OF THE PREFERRED EMBODIMENTS

Embodiments of the present invention are explained by referring to diagrams as follows. In the following description, it is assumed that the present invention is applied to a LAN system (or a home network system) built at a home.

[Configuration of the Home Network]

Figure 1:
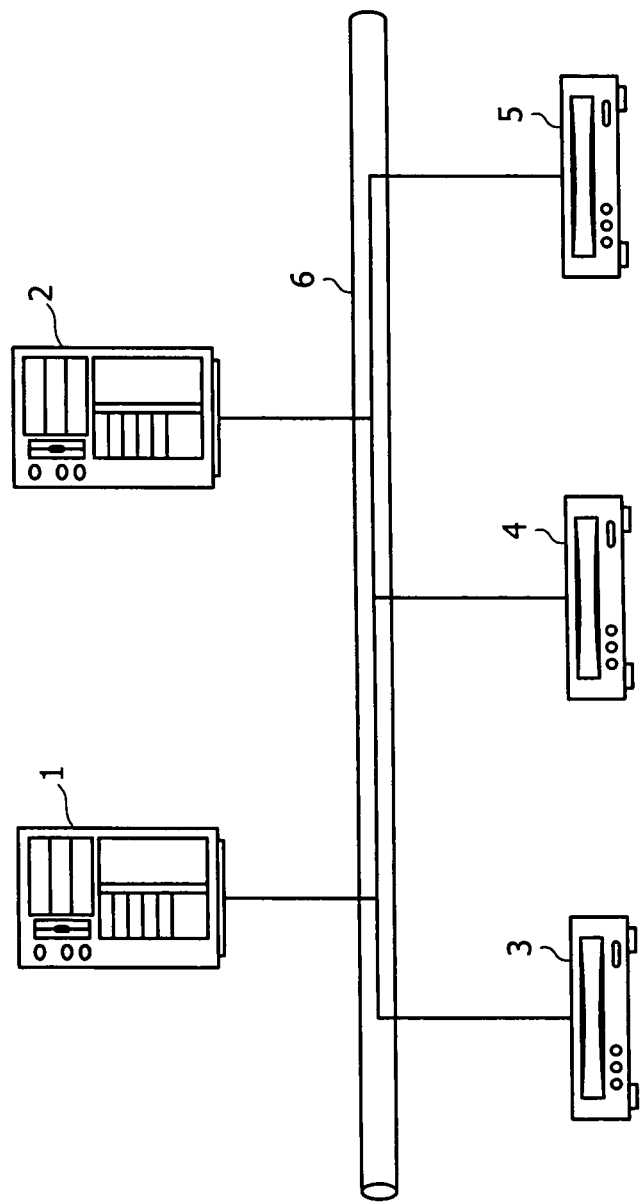
FIG. 1 is a diagram showing a typical configuration of the home network system implemented by an embodiment of the present invention.

FIG. 1 is a diagram showing a typical configuration of the home network system implemented by an embodiment of the present invention.

The typical configuration of a home network system shown in FIG. 1 includes servers 1 and 2, audio reproduction apparatus 3 to 5 as well as a LAN 6 for connecting the servers 1 and 2 as well as the audio reproduction apparatus 3 to 5 to each other.

Typically, the servers 1 and 2 are each an information-processing apparatus such as a personal computer. Each of the servers 1 and 2 has a function for connection to the LAN 6 and a reproduction unit for reproducing data from a large-capacity storage medium such as an HDD (Hard Disk Drive) and from an optical disk such as a CD (Compact Disk) and a DVD (Digital Versatile Disk). The servers 1 and 2 are each capable of providing audio data recorded on the HDD, the CD or the DVD to the audio reproduction apparatus 3 to 5 by way of the LAN 6. In this embodiment, the servers 1 and 2 are installed in different rooms. For example, the servers 1 and 2 are installed in a living room and a study room respectively.

Examples of the audio reproduction apparatus 3 to 5 are a CD player and a radio tuner, which each have a function for connection to the LAN 6. Each of the audio reproduction apparatus 3 to 5 has the conventional function for reading out audio data from a CD for reproduction or receiving a radio broadcast signal for reproduction. In addition, the audio reproduction apparatus 3 to 5 each have a function for receiving audio data provided by the server 1 or 2 by way of the LAN 6, decoding the received audio data and reproducing the decoded data. In this embodiment, the audio reproduction apparatus 3 to 5 are installed in different rooms.

As described above, the servers 1 and 2 implemented by the embodiment each have a function of an information-provision apparatus. On the other hand, each of the audio reproduction apparatus 3 to 5 has a function of a client (or an information reproduction apparatus) for receiving audio data from the server 1 or 2 and reproducing the received data.

The user is capable of enjoying an audio content provided by the server 1 or 2 to any one of the audio reproduction apparatus 3 to 5. That is to say, each of the audio reproduction apparatus 3 to 5 is capable of selecting the server 1 or 2 as a source of audio-data transmission in dependence on what audio data (or audio content) to be reproduced.

In addition, each of the audio reproduction apparatus 3 to 5 is typically implemented by the so-called network-participation electronic apparatus conforming to UPnP (Universal Plug & Play) specifications announced by Microsoft of the US in order to make connections between the electronic apparatuses simple.

It is to be noted that the UPnP specifications can be applied to an IEEE (Institute of Electrical and Electronic Engineers) 802 network, which is a representative network in network communications each using a 10/100 BASE-T Ethernet (a trademark). The UPnP specifications are specifications for a group of protocols and a data format. The group of protocols includes an IP as well as a UDP (User Datagram Protocol) and a TCP of the IP. The UPnP specifications are provided to upgrade the functions of Internet standard communication (TCP/IP communication).

In addition, by adopting the UPnP specifications in the so-called CE (Consumer Electronics) apparatus such as an audio reproduction apparatus, the CE apparatus such as an audio reproduction apparatus, another CE apparatus and a personal computer are capable of mutually authenticating each other with ease so that a service can be rendered by way of a network and executed in a simple as well as proper manner without requiring the user to carry out cumbersome operations.

[Overview of the UPnP Specifications]

Figure 2:
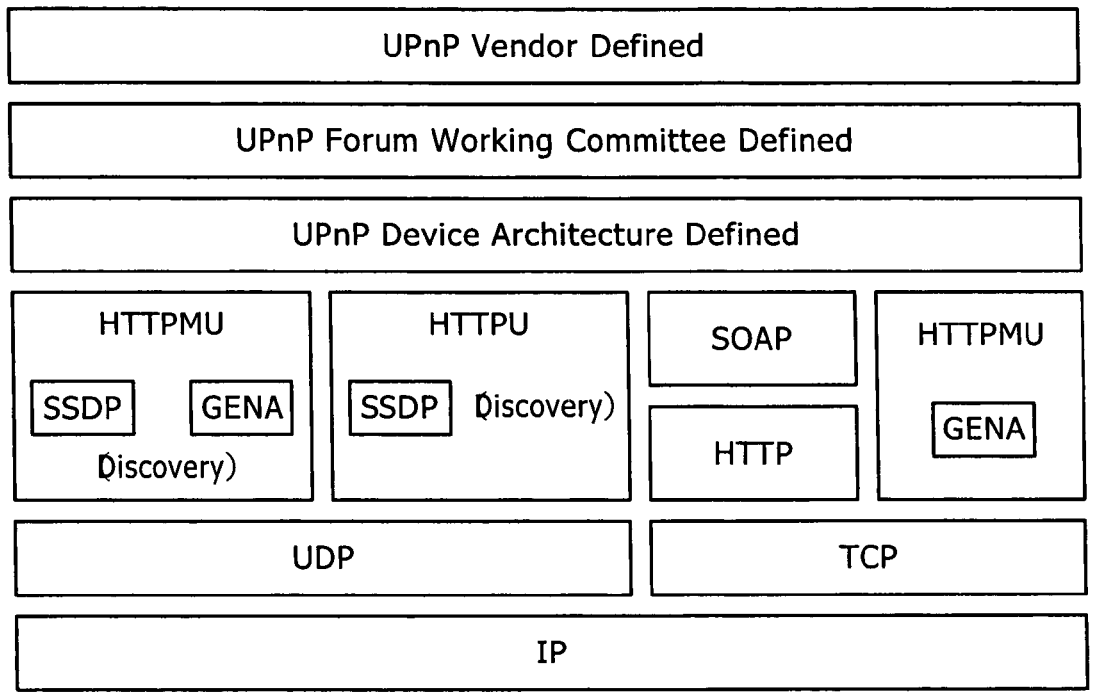
FIG. 2 is an explanatory diagram showing a protocol stack according to the UPnP specifications.

FIG. 2 is an explanatory diagram showing a protocol stack (or the structure of a protocol group) according to the UPnP specifications.

As shown in FIG. 2, in accordance with the UPnP specifications, actual data is transmitted and received by using Internet standard communication protocols. In addition, in order to implement original functions of the UPnP specifications described below, a group of protocols such as an SSDP (Simple Service Discovery Protocol), a GENA (General Event Notification Architecture), a SOAP (Simple Object Access Protocol) and an HTTP (HyperText Transfer Protocol) is used.

In addition, in accordance with the UPnP specifications, the structure of a protocol group also includes UPnP vendor definitions (UPnP Vendor Defined), UPnP forum working committee definitions (UPnP Forum Working Committee Defined) and UPnP device architecture definitions (UPnP Device Architecture Defined) as shown in FIG. 2.

On the top of that, the UPnP specifications prescribe 6 functions, i.e., addressing, discovery, description, control, eventing and presentation.

A UPnP apparatus such as an audio reproduction apparatus conforms to prescriptions referred to as an UPnP/AV/architecture in order to use audio data by utilization of UPnP functions. A UPnP apparatus is defined as an electronic apparatus conforming to the UPnP specifications. UPnP apparatus in the UPnP/AV/architecture are classified into three categories as follows.

In the UPnP/AV/architecture, UPnP apparatuses are classified into a media server for providing contents, a control point functioning as a control terminal and a media renderer functioning as a reproduction apparatus. The media server corresponds to an apparatus generally referred to as a server in the network system. On the other hand, the media renderer corresponds to an apparatus generally referred to as a client in the network system.

The control point also referred to as a control apparatus is capable of controlling UPnP apparatus connected to the network. Functions of the control point allow the control point to be mounted on a media server or a media renderer, allow the control point to be mounted on all electronic apparatus connected to the network and allow the control point to be mounted on any ones of electronic apparatuses connected to the network. In this embodiment, as an example, the servers 1 and 2 as well as the audio reproduction apparatus 3 to 5 each have the functions of the control point.

The addressing function prescribed in the UPnP specifications as a function of a UPnP apparatus is a function to acquire an address for identifying the UPnP apparatus itself in the IEEE802 network. In the addressing function, a DHCP (Dynamic Host Configuration Protocol) or an Auto-IP is adopted.

The discovery function is carried out after the addressing. By carrying out the discovery, the control point is capable of discovering a controlled target apparatus, which is either a media server or a media renderer. The control executed in this case is the SSDP described above. When any of electronic apparatus composing the network system is connected to the IEEE802 network, the electronic apparatus broadcasts a message for announcing a device address and service of its own to the IEEE802 network by transmitting a packet with a transmission destination specially unspecified. Receiving this broadcasted message, a control point is capable of knowing what apparatus was just connected to the IEEE802 network.

An SSDP packet output by an electronic apparatus discovered by the control point through execution of the discovery function as a controlled device includes a URL (Uniform Resource Locator) of a device description. By making an access to the URL, the control point is capable of acquiring more detailed information on the device from the device description.

The information on the device includes icon information, a model name, the manufacturer, the commodity name (trade name) and a service description explaining detailed information on a service rendered by the device. From these device description and the service description, the control point is capable of knowing a method of making an access to this device, which serves as a target apparatus. The device description and the service description are expressed in an XML (extensible Markup Language).

Control functions are classified into two large function categories, i.e., an action and a query. An action is carried out in accordance with a method prescribed in action information in the service description. By invoking an action, the control point is capable of operating the target apparatus. A query is carried out to fetch device information referred to as a state variable from the service description. In these control functions, a transport protocol called the SOAP mentioned earlier is utilized and expressed in the XML.

The eventing function is carried out by the target apparatus to inform the control point that information on the apparatus has been changed. By analyzing the service description of a target apparatus, the control point is capable of identifying a variable indicating the target apparatus from the information on the apparatus and receiving a notice issued by the target apparatus when the variable is changed. In the eventing function, a transport protocol called the GENA mentioned earlier is utilized and expressed in the XML.

The presentation function is carried out to provide the user with a control section using a user interface. By making an access to a presentation URL described in the device description, it is possible to obtain a presentation page expressed in an XTML. With this function, a presentation can be made in the target apparatus.

By carrying out the UPnP functions described above, each UPnP apparatus is capable of not only participating in the network and entering a state of being capable of carrying out communications without requiring the user to specially carry out cumbersome operations, but also automatically detecting another UPnP apparatus and establishing a connection with the other UPnP apparatus.

Figure 3:
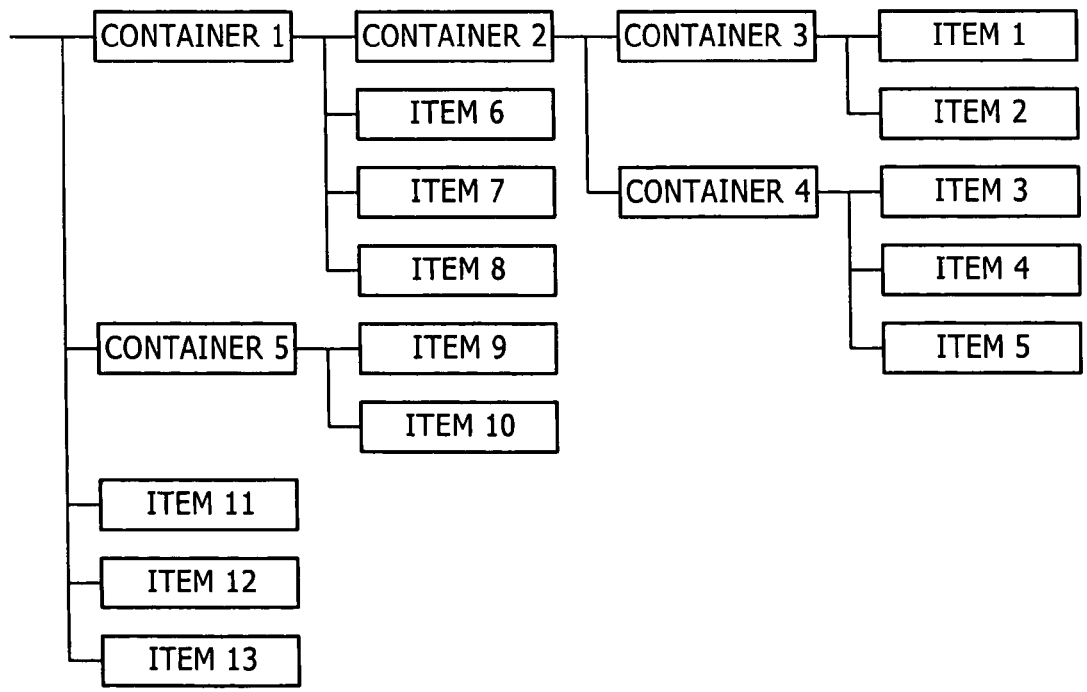
FIG. 3 is a diagram showing a tree structure for managing contents stored in a media server.

Next, refer to FIG. 3, which is a diagram showing a tree structure for managing contents stored in a media server.

The media server, which is a UPnP apparatus, includes an embedded function (or service) called a CDS (Contents Directory Service). By carrying out this function, the media server is capable of informing a control point of how contents are stored in the media server. The CDS uses two kinds of objects of abstraction, i.e., a container and an item. The container and the item respectively correspond to the folder and the file in Windows (a registered trademark), which is the name of an OS (Operating System) provided by Microsoft of the US. Containers and items always form a tree structure like one shown in FIG. 3. It is to be noted that, in this embodiment, a distributed audio content (or audio data) is an item in the tree structure shown in FIG. 3.

By acquiring the tree structure shown in FIG. 3 from a media server, a control point is capable of obtaining the URL of each of content included in the tree structure. As explained earlier, the URL is a link describing information on the location of a resource. Then, if information on a desired audio content (or item) can be obtained, a function of the media server can be used to carry out operations on the audio data (or the audio track). The operations include an operation to reproduce the audio data and an operation to stop the reproduction of the audio data. The function used to carry out operations is referred to as an AV transport.

In this embodiment, as described earlier, the servers 1 and 2 as well as the audio reproduction apparatus 3 to 5 are each put in a state of being capable of carrying out TCP/IP communications by execution of the UPnP addressing function and authenticating each other by execution of the UPnP discovery function. Thus, each of the servers 1 and 2 as well as the audio reproduction apparatus 3 to 5 is capable of grasping the configuration of the network and carrying out a communication with a desired electronic apparatus.

[Typical Configuration of the Server]

The following description explains a typical configuration of each of the electronic apparatus composing the home network system implemented by the embodiment. First of all, refer to FIG. 4, which is a block diagram showing the basic configuration of the server 1.

Figure 4:
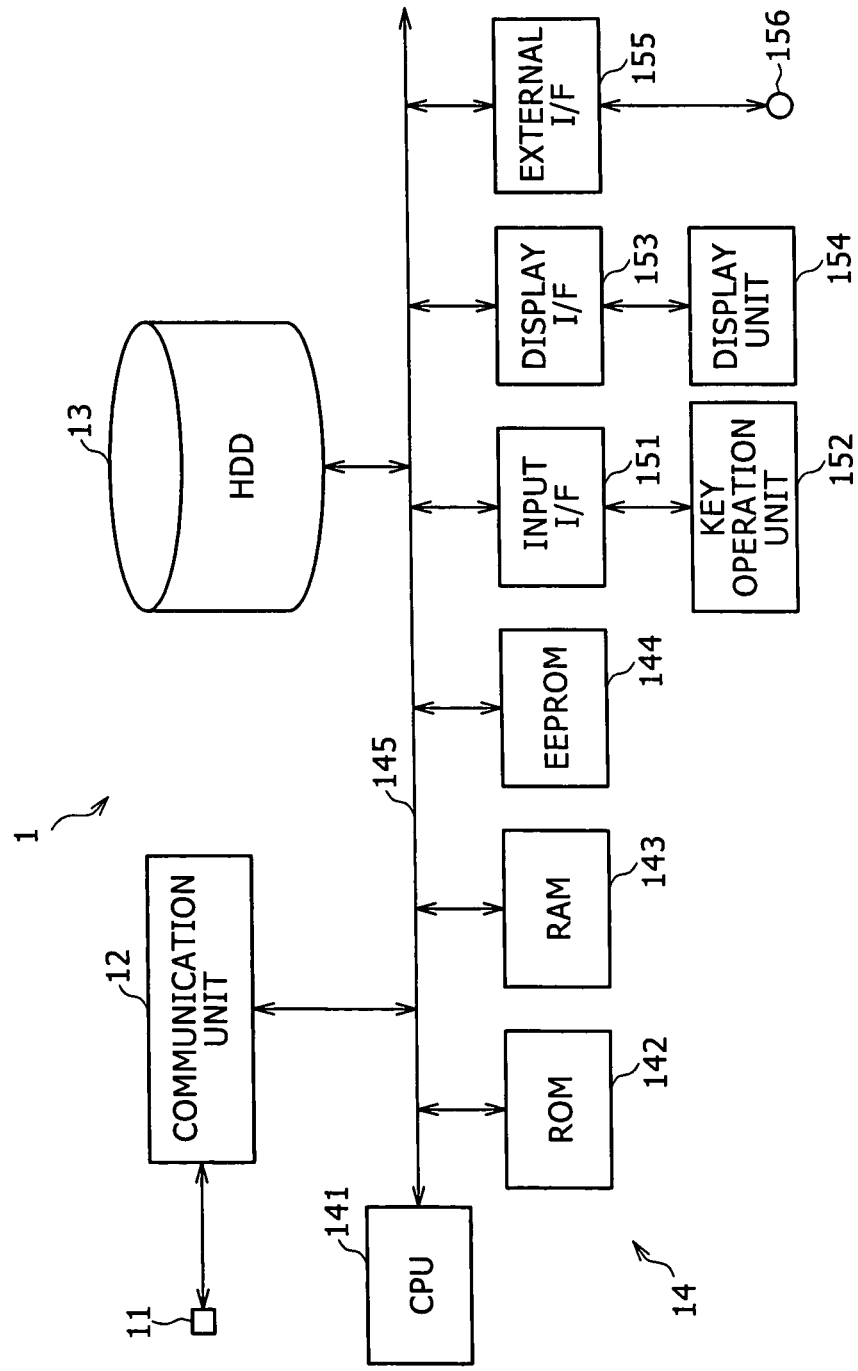
FIG. 4 is a block diagram showing the basic configuration of a server.

As shown in FIG. 4, the server 1 includes a communication terminal 11, a communication unit 12, an HDD 13, a control unit 14, an input interface (I/F) 151, a key operation unit 152, a display interface (I/F) 153, a display unit 154, an external interface (I/F) 155 and a external input/output terminal 156. The communication terminal 11 is a terminal connected to the LAN 6.

A cable of the LAN 6 is connected to the communication terminal 11. The communication unit 12 is thus connected to the LAN 6 through the communication terminal 11 so that the server 1 is capable of exchanging data with other apparatus. It is to be noted that the internal configuration of the communication unit 12 will be explained later in detail by referring to FIG. 5.

The HDD 13 is a storage device having a storage capacity large enough for storing data including a large number of digital contents or presentation information. In addition, the HDD 13 is also used for storing a variety of programs and data for processing. The HDD 13 also includes a work area used in processes to decode a content and transmit a content to another apparatus by way of the LAN 6.

The control unit 14 is a microcomputer for controlling other components in the server 1. The control unit 14 includes a CPU (Central Processing Unit) 141, a ROM (Read Only Memory) 142, a RAM (Random Access Memory) 143 and an EEPROM (Electronically Erasable and Programmable ROM) 144, which are connected to each other by a CPU bus 145. It is to be noted that the communication unit 12, the HDD 13, the input I/F 151, the display I/F 153 and the external I/F 155 are also connected to the CPU bus 145 and controlled by the CPU 141 through the CPU bus 145.

The ROM 142 is a memory for storing programs to be executed by the CPU 141 and data required in processing. The RAM 143 is a memory mainly used as a work area in various kinds of processing. The EEPROM 144 is the so-called nonvolatile memory used for storing and holding data such as a variety of parameters.

The key operation unit 152 is an input unit for receiving operation inputs entered by the user. The key operation unit 152 includes arrow keys operated to move a cursor and a variety of function keys. A control signal representing an operation input entered by the user via the key operation unit 152 is supplied to the control unit 14 by way of the input I/F 151. Thus, in accordance with the control signal, the server 1 carries out processing according to the operation input entered by the user.

The display unit 154 is an output unit for displaying an image. The display unit 154 receives a video signal to be displayed from the display I/F 153, which is controlled by the control unit 14, and displays a variety of pictures on a screen of its own in accordance with the received video signal.

The external I/F 155 is a unit for controlling operations to exchange data with an external apparatus connected to the external input/output terminal 156. To be more specific, when the server 1 outputs data to the external apparatus, the external I/F 155 reshapes the data in an output format determined in advance and outputs the reshaped data to the external apparatus by way of the external input/output terminal 156. In addition, the external I/F 155 converts data received in a predetermined format from an external apparatus through the external input/output terminal 156 into data in a format presentable to the control unit 14 and supplies the data obtained as a result of the conversion to the control unit 14.

It is to be noted that the server 1 is typically implemented as a personal computer. In this case, the key operation unit 152 includes a keyboard and a mouse pointer whereas the display unit 154 is a CRT (Cathode Ray Tube) or an LCD (Liquid Crystal Display). In addition, by providing the personal computer with additional components such as reproduction units for CDs and DVDs or recording/reproduction units for recordable CDs and recordable DVDs, the personal computer is capable of reading out data from these CDs and DVDs and utilizing the data as well as capable of writing data onto the recordable CDs and recordable DVDs. It is to be noted that the additional components are not shown in the figure.

Figure 5:
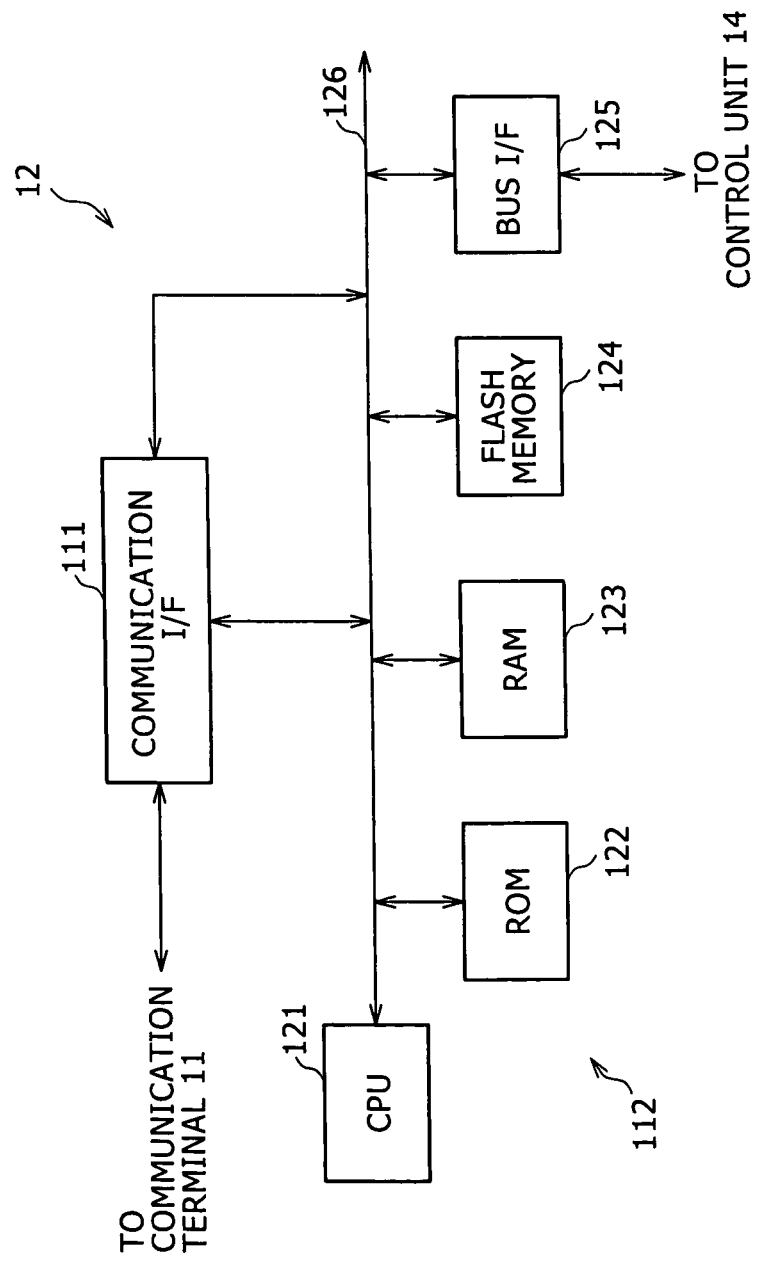
FIG. 5 is a block diagram showing the internal configuration of a communication unit employed in a server.

FIG. 5 is a block diagram showing the internal configuration of the communication unit 12. As shown in FIG. 5, the communication unit 12 includes a communication I/F 111 and a control unit 112. The control unit 112 includes a CPU 121, a ROM 122, a RAM 123, a flash memory 124 and a bus I/F 125, which are connected to each other by an internal bus 126. It is to be noted that the communication I/F 111 is also connected to the internal bus 126 and controlled by the CPU 121 through the internal bus 126.

Controlled by the control unit 112, the communication I/F 111 carries out processing such as a process to convert data received from the LAN 6 through the communication terminal 11 in a predetermined format into data with a format that can be processed by the server 1, and supply the data obtained as a result of the conversion to the main control unit 14 by way of the bus I/F 125. In addition, the communication I/F 111 also carries out processing such as a process to convert data to be transmitted from the server 1 to another apparatus connected to the LAN 6 into data having a transmission format and output the data having a transmission format to the LAN 6 by way of the communication terminal 11. Controlled by the control unit 112 employed in the communication unit 12, the communication I/F 111 carries out processing conforming to the Ethernet. The processing includes a process to detect the existence/non-existence of data on the LAN 6 and detect collisions between transmitted data or transmitted packets. The process to detect the existence/non-existence of data on the LAN 6 is referred to as detection of a carrier.

The ROM 122 employed in the control unit 112 is a memory for storing programs to be executed by the CPU 121 and data required in processing. The RAM 123 is a memory mainly used as a work area in various kinds of processing. The flash memory 124 is a rewritable nonvolatile memory used for storing and holding data such as a variety of set parameters relevant to communication.

In the configuration described above, the server 1 is connected to the LAN 6 through the communication unit 12 and the communication terminal 11. The communication unit 12 implements UPnP functions, which allow the server 1 to be connected to the LAN 6 and data to be exchanged with another apparatus by way of the LAN 6 in various kinds of processing. To put it concretely, the server 1 is capable of receiving data transmitted to itself by way of the LAN 6 and storing the data in a memory such as the HDD 13. In addition, in accordance with a request received from an apparatus serving as a partner as a request for presentation of desired data, the server 1 is also capable of reading out the desired data from a memory such as the HDD 13 and transmitting the data to the partner apparatus by way of the communication unit 12, the communication terminal 11 and the LAN 6.

It is to be noted that, since the server 2 is implemented into the same configuration as the server 1 described above, the explanation of the server 2 is omitted.

[Typical Configuration of the Audio Reproduction Apparatus]

Figure 6:
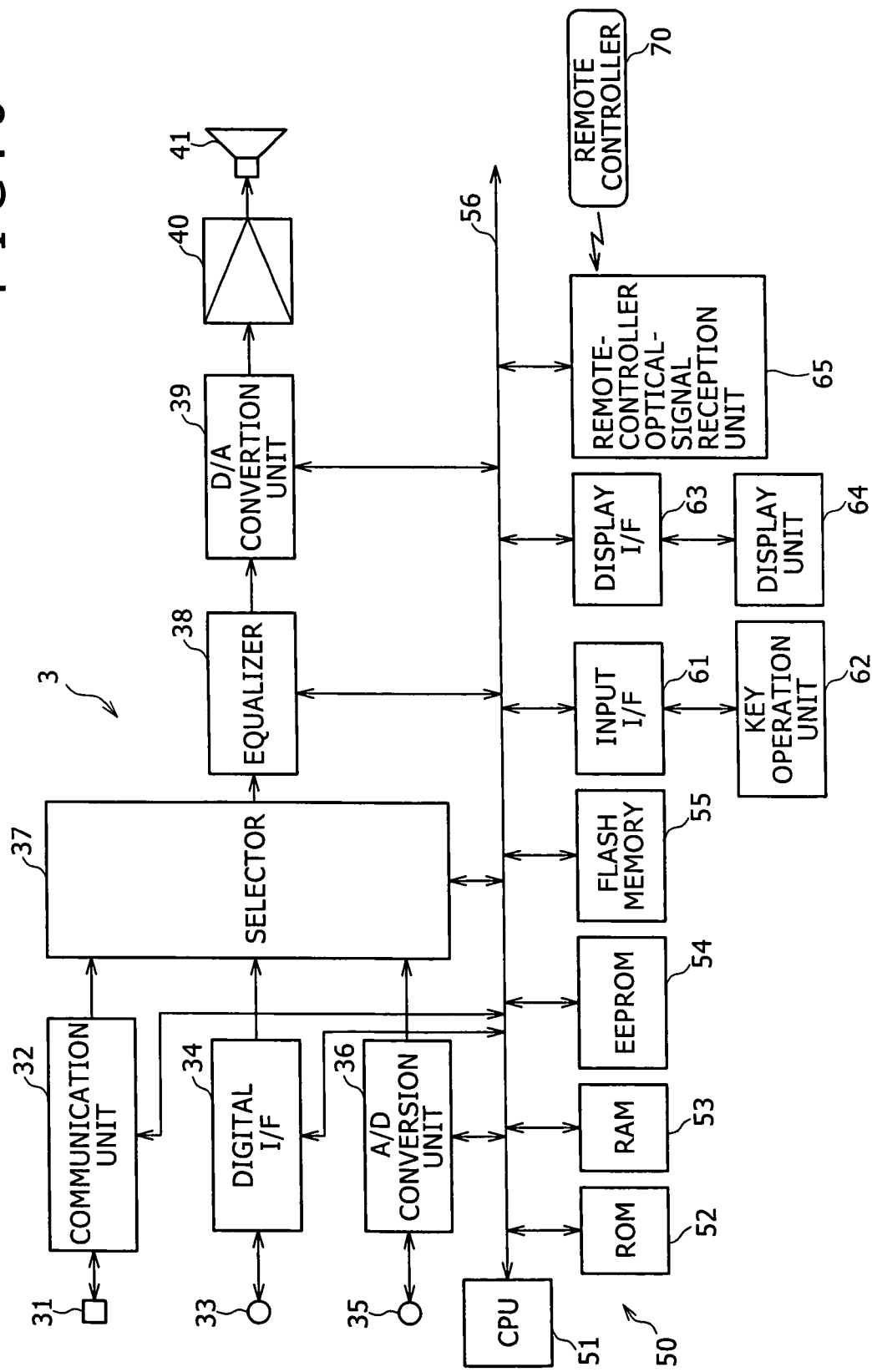
FIG. 6 is a block diagram showing a typical configuration of an audio reproduction apparatus.

FIG. 6 is a block diagram showing a typical configuration of the audio reproduction apparatus 3.

As shown in FIG. 6, the audio reproduction apparatus 3 includes a communication terminal 31, a communication unit 32, a digital input terminal 33, a digital I/F 34, an analog input terminal 35, an analog/digital (A/D) conversion unit 36, a selector 37, an equalizer 38, a digital/analog (D/A) conversion unit 39, an audio amplifier 40, a speaker 41, a control unit 50, an input I/F 61, a key operation unit 62, a display I/F 63, a display unit 64 and a remote-controller optical-signal reception unit 65.

The control unit 50 is a microcomputer for controlling other components employed in the audio reproduction apparatus 3. The control unit 50 includes a CPU 51, a ROM 52, a RAM 53, an EEPROM 54 and a flash memory 55, which are connected to each other by a CPU bus 56.

The ROM 52 is a memory for storing programs to be executed by the CPU 51 and data required in processing. The RAM 53 is a memory mainly used as a work area in various kinds of processing. The EEPROM 54 is the so-called nonvolatile memory used for storing various kinds of data that should be kept even if the power supply of the audio reproduction apparatus 3 is turned off. The flash memory 55 is a rewritable nonvolatile memory used for storing and holding data such as a variety of set parameters relevant to communication.

It is to be noted that the communication unit 32, the digital I/F 34, the analog/digital (A/D) conversion unit 36, the selector 37, the equalizer 38, the digital/analog (D/A) conversion unit 39, the audio amplifier 40, the input I/F 61, the display I/F 63 and the remote-controller optical-signal reception unit 65 are also connected to the CPU bus 56 and controlled by the CPU 51 through the CPU bus 56.

Much like the communication unit 12 employed in the server 1, the communication unit 32 implements UPnP functions, which allow the audio reproduction apparatus 3 to be connected to the LAN 6 and data to be exchanged with another apparatus by way of the LAN 6 in various kinds of processing. For example, the communication unit 32 converts data transmitted to the audio reproduction apparatus 3 itself from the LAN 6 by way of the communication terminal 31 into data that can be processed by the audio reproduction apparatus 3. If the data transmitted to the audio reproduction apparatus 3 itself is audio data, the data is supplied to the selector 37 at a later stage. If data transmitted to the audio reproduction apparatus 3 itself is control data, on the other hand, the data is supplied to the control unit 50. In addition, controlled by the control unit 50, the communication unit 32 creates a command to be transmitted to a desired electronic apparatus and transmits the command to the desired electronic apparatus by way of the LAN 6. The communication unit 32 also carries out processing conforming to the Ethernet. Examples of the processing are detection of carriers and detection of collisions as described earlier.

The digital input terminal 33 is a component for receiving digital audio data from a variety of digital-information-processing apparatus installed outside the audio reproduction apparatus 3. The digital I/F 34 is a component for converting the digital data supplied to the digital input terminal 33 into data that can be processed by the audio reproduction apparatus 3 and supplying the data obtained as a result of the conversion to the selector 37.

The analog input terminal 35 is a component for receiving digital audio data from a variety of audio apparatus installed outside the audio reproduction apparatus 3. The A/D conversion unit 36 is a component for converting the audio data supplied to the analog input terminal 35 into digital data having a predetermined format and supplying the digital data obtained as a result of the conversion to the selector 37.

The selector 37 is a component for selecting audio data supplied by the communication unit 32, the digital I/F 34 or the A/D conversion unit 36 and supplies the selected audio data to the equalizer 38. The selector 37 selects audio data in accordance with a command entered by the user via a key operation unit 62 and the input I/F 61 or via an external remote controller 70 and the remote-controller optical-signal reception unit 65.

The equalizer 38 is a component for carrying out audio-quality adjustment on the audio data received from the selector 37 and outputting the result of the adjustment to the D/A conversion unit 39. The user enters parameters of the audio-quality adjustment to the control unit 50 via the key operation unit 62 and the input I/F 61. The control unit 50 passes on the parameters to the equalizer 38.

The D/A conversion unit 39 is a component for converting the digital audio data received from the equalizer 38 into analog audio data. The audio amplifier 40 is a component for amplifying the analog data received from the D/A conversion unit 39 to a predetermined level and outputting the result of the amplification to the speaker 41. The speaker 41 is a component for generating a sound according to the analog audio signal supplied thereto by the audio amplifier 40.

It is to be noted that the functions of the equalizer 38 and the D/A conversion unit 39 can also be implemented by software executed by the control unit 50.

The key operation unit 62 is connected to the control unit 50 through the input I/F 61. The input I/F 61 has a variety of operation keys to be operated by the user to enter an operation input. The key operation unit 62 then generates a control signal representing the operation input and supplies the signal to the control unit 50 by way of the input I/F 61.

The display unit 64 is connected to the control unit 50 through the display I/F 63. The display unit 64 is a display unit implemented typically by an LCD or an organic EL (Electro-Luminescence) device. The display unit 64 shows various kinds of display information such as a guidance message, an error message and status in accordance with a display signal received from the display I/F 63.

The remote-controller optical-signal reception unit 65 is a component for receiving typically an infrared signal from the external remote controller 70, converting the infrared signal into an electrical signal and supplying the electrical signal to the control unit 50. The remote controller 70 has a variety of operation keys to be operated by the user to enter an operation input, and generates a signal representing the operation input.

It is to be noted that, since the other audio reproduction apparatus 4 and 5 each have the same configuration as the audio reproduction apparatus 3, their descriptions are omitted.

[Operations of the Home Network]

In the home network system described above, when the user desires an audio content stored in any of the server 1 and 2 each serving as a media server to be reproduced in any of the audio reproduction apparatus 3 to 5 each serving as a media renderer, normally, it is necessary to execute a processing procedure like one described as follows.

The processing procedure includes the following three steps of:

(1): selecting a server holding a desired audio content.
(2): specifying the desired audio content.
(3): selecting an audio reproduction apparatus to reproduce the desired audio content.

It is to be noted that, in the case of the home network system implemented by this embodiment, a plurality of servers and a plurality of audio reproduction apparatus coexist. Thus, above steps (1) to (3) of the procedure must be executed. If only one server exists, however, step (1) of selecting a server holding a desired audio content is not necessary. By the same token, if only one audio reproduction apparatus exists, step (3) of selecting an audio reproduction apparatus to reproduce a desired audio content is also not necessary.

In addition, the processing procedure may vary from case to case in dependence on which apparatus includes a control point. If the control point is implemented in a specific audio reproduction apparatus, for example, the specific audio reproduction apparatus is normally selected as the apparatus to reproduce the desired audio content. The selection of such an audio reproduction apparatus is a natural step. Thus, in this case, it is not necessary to specially select an audio reproduction apparatus to reproduce the desired audio content. If the control point is implemented in a specific server, on the other hand, the specific server is selected as the apparatus containing the desired audio content in many cases. Thus, the step of selecting a server holding the desired audio content can be omitted.

In the conventional home network system, in general, by executing above steps (1) to (3) of the procedure, a desired audio content stored in a selected server can be reproduced in a selected audio reproduction apparatus. Since processing such as an operation to select an audio content to be reproduced in a specific audio reproduction apparatus is carried out by operating the specific audio reproduction apparatus itself, however, it is difficult to control operations to start and stop distribution of an audio content to a plurality of particular audio reproduction apparatus and an operation to reproduce the audio content in these particular audio reproduction apparatus by merely operating one audio reproduction apparatus.

In order to solve this problem, in the home network system implemented by this embodiment, by operating only any one specific audio reproduction apparatus, it is possible to control an operation to distribute an audio content from a server and content reproduction operations of not only this specific audio reproduction apparatus, but also other audio reproduction apparatus and, hence, possible to switch an operation to reproduce the audio content from one audio reproduction apparatus to another among a plurality of audio reproduction apparatuses. To put it concretely, an apparatus functioning as a control point is capable of changing distribution destinations of an audio content from a media server and controlling operations carried out by a plurality of media renderers to reproduce the content.

[Typical Operations 1: Operating a Content Reproduction Apparatus in Operation to Change the Content Reproduction Apparatus]

1-1: Basic Operations

Figure 7:
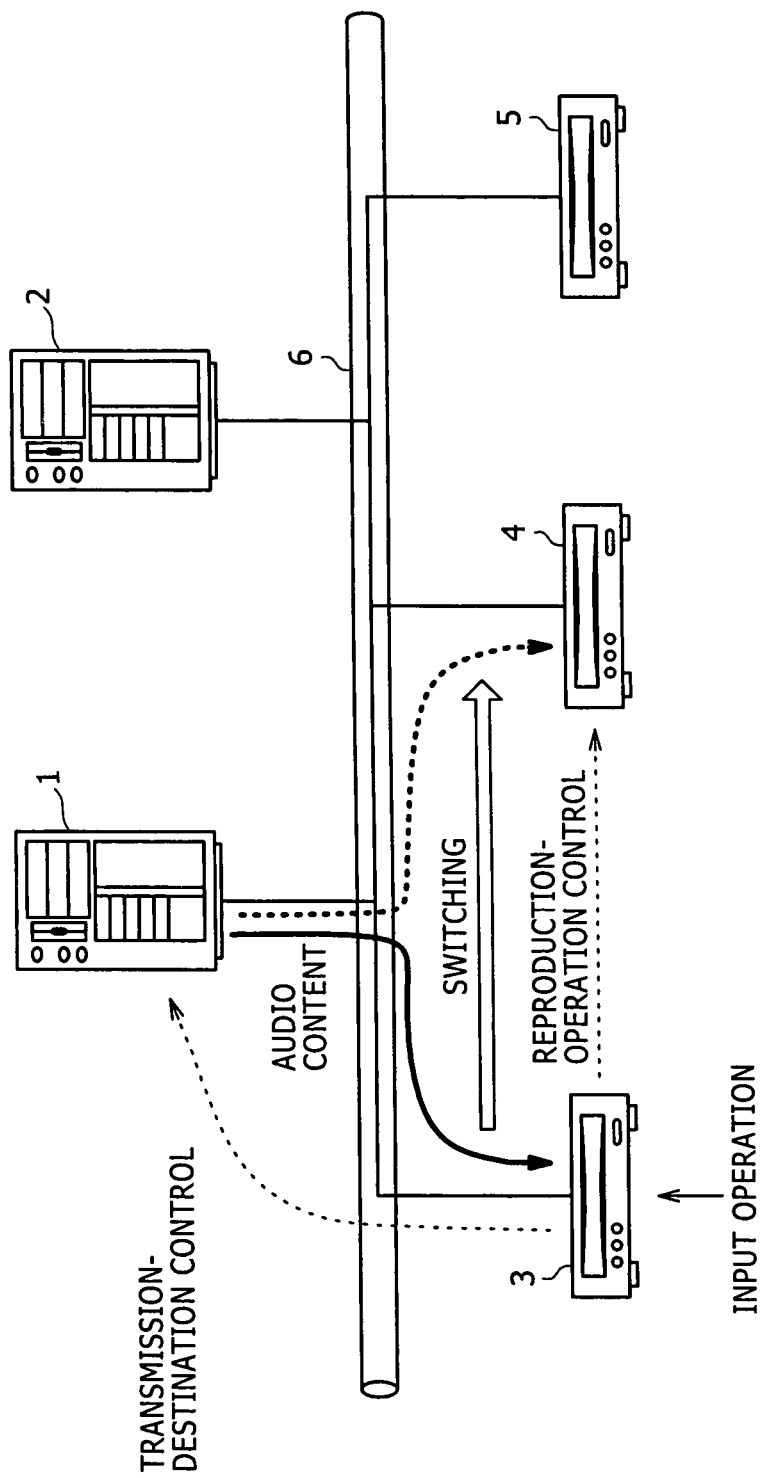
FIG. 7 is an explanatory diagram showing an outline of an operation, which is carried out in a whole home network system when an audio reproduction apparatus presently reproducing an audio content is operated to switch an operation of reproducing the audio content to another audio reproduction apparatus.

First of all, by referring to FIG. 7, the following description explains a case in which typical basic operations are carried out on an audio reproduction apparatus currently reproducing an audio content as operations to switch a process to reproduce the audio content from the audio reproduction apparatus reproducing the audio content to another. FIG. 7 is an explanatory diagram showing an outline of the operations carried out in this case in the whole home network system.

In the explanatory diagram of FIG. 7, in a state where an audio content distributed by the server 1 is received and reproduced by the audio reproduction apparatus 3, an operation input is entered to the audio reproduction apparatus 3 currently reproducing the audio content in order to switch the operation to reproduce the audio content from the audio reproduction apparatus 3 to the audio reproduction apparatus 4 so as to allow the same audio content reproduced so far to be reproduced continuously.

Assume for example that the audio reproduction apparatus 3 and 4 are installed in different rooms, and the user who has been listening to a piece of music so far from the audio reproduction apparatus 3 installed in a specific room moves to another room and desires to listen to the continuation of the piece of music listened to so far from the audio reproduction apparatus 4 installed in the other room. In this case, a capability of operating the audio reproduction apparatus 3 installed in the specific room in order to switch the operation to reproduce the piece of music from the audio reproduction apparatus 3 to the audio reproduction apparatus 4 is considered to be most natural to the user.

In the case described above, the server 1 functions as a media server while the audio reproduction apparatus 3 and 4 each serve as a media renderer. In addition, the server 1 requires a control-point function to control the operation to distribute an audio content whereas the audio reproduction apparatus 3 and 4 each require a control-point function to control the operation to reproduce the content. In this embodiment, all apparatus connected to the LAN 6 have all the aforementioned functions of the control point. Thus, by operating any one of the apparatus as a control point, the capability described above can be realized.

In the following description, the audio reproduction apparatus 3 receiving an operation input to switch the operation to reproduce the piece of music from the audio reproduction apparatus 3 to the audio reproduction apparatus 4 functions as a control point. In this case, the audio reproduction apparatus 3 functioning as a control point is thus capable of controlling the operation carried out by the server 1 to distribute the piece of music, the operation carried out by the audio reproduction apparatus 3 itself to reproduce the piece of music and the operation carried out by the audio reproduction apparatus 4 to reproduce the piece of music.

In a simplest operation procedure, first of all, the user enters an operation input to the audio reproduction apparatus 3 installed in the specific room from which the user is going to move to designate the audio reproduction apparatus 4 in the other room as a new transmission destination of the audio content. To put it more concretely, at that time, the audio reproduction apparatus 3 itself is specified as a media renderer to end the operation of reproducing the audio content while the audio reproduction apparatus 4 is newly designated as a media renderer to start an operation of reproducing the audio content. In addition, the server 1 is specified as a media server functioning as the source of the operation to transmit the audio content. In this embodiment, however, the audio reproduction apparatus 3 recognizes that the audio reproduction apparatus 3 itself is currently reproducing the audio content and the server 1 is functioning as the source of the operation to transmit the audio content. Thus, the user merely needs to carry out only an operation to newly designate the audio reproduction apparatus 4 as a media renderer.

When the user carries out such an operation, the audio reproduction apparatus 3 requests the server 1 to change the destination of the operation to transmit the audio content from the audio reproduction apparatus 3 to the audio reproduction apparatus 4. At the same time, the audio reproduction apparatus 3 ends the operation carried out by itself to reproduce the audio content and requests the audio reproduction apparatus 4 to start an operation to receive and reproduce the audio content.

At a request made by the audio reproduction apparatus 3, the server 1 stores the data of the audio content being transmitted in a packet destined for the audio reproduction apparatus 4 and outputs the packet to the LAN 6. At the same time, the server 1 ends the transmission of packets of the audio content to the audio reproduction apparatus 3. In addition, the audio reproduction apparatus 3 also terminates the operation to reproduce the audio content whereas the audio reproduction apparatus 4 starts an operation to receive and reproduce data transmitted by the server 1 in accordance with a control signal received from the audio reproduction apparatus 3.

In the processing described above, by operating only the audio reproduction apparatus 3 installed in the specific room, the user is capable of switching the operation to reproduce the audio data from the audio reproduction apparatus 3 to the audio reproduction apparatus 4 so that, in the other room, the user can listen to the continuation of the piece of music listened to so far in the specific room. It is thus possible to realize a high degree of operatability to switch the operation to reproduce an audio content from one audio reproduction apparatus to another.

1-2: More Desirable Operations

When an operation to reproduce a piece of music must be switched from the audio reproduction apparatus 3 installed in a specific room to the audio reproduction apparatus 4 installed in another room to accompany a movement of the user from the specific room to the other room as described above, it is more desirable for the user to allow the audio reproduction apparatus 3 to automatically continue its operation to reproduce the piece of music for a predetermined period of time following the process of switching the operation to reproduce the piece of music from the audio reproduction apparatus 3 to the audio reproduction apparatus 4. In this case, in the predetermined period of time which is an overlap period of time, both the audio reproduction apparatus 3 installed in the pre-movement specific room and the audio reproduction apparatus 4 installed in the post-movement other room reproduce the same piece of music concurrently in a synchronous manner. Thus, the user can listen to the piece of music without interruption while the user is moving from the specific room to the other room.

In order to implement the operations described above, the audio reproduction apparatus 3 operating as a control point is required to have a function for managing content distribution start and end times for each distribution destination as a function of a media server as well as controlling reproduction operations carried out in media renderers synchronously with the content distribution start and end times. In addition, the server 1 serving as a media server is required to have a function to synchronously distribute the same content at the same time to a plurality of media renderers under control executed by a control point.

In addition, in the operation described above, while both the audio reproduction apparatus 3 installed in a specific room and the audio reproduction apparatus 4 installed in the other room are reproducing the same piece of music, the volume of a sound reproduced in the pre-movement specific room can be gradually reduced to make the sound gradually fade out while the volume of a sound reproduced in the post-movement other room can be gradually increased to make the sound gradually fade in. In this way, the user can continue listening to the piece of music with a natural sense having a low degree of incompatibility. In order to implement such an operation, for example, it is nice to prescribe a control command to be issued by a control point to a media renderer as a command making a request for an operation to control the volume of a sound being reproduced, that is, a request for a fade-in or fade-out operation.

The following description explains processing carried out by apparatus to implement the operations described above. First of all, processing carried out by the audio reproduction apparatus 3 is described. In the following description, the processing carried out by the audio reproduction apparatus 3 is explained by focusing the explanation on the function of the audio reproduction apparatus 3 serving as a control point.

Figure 8:
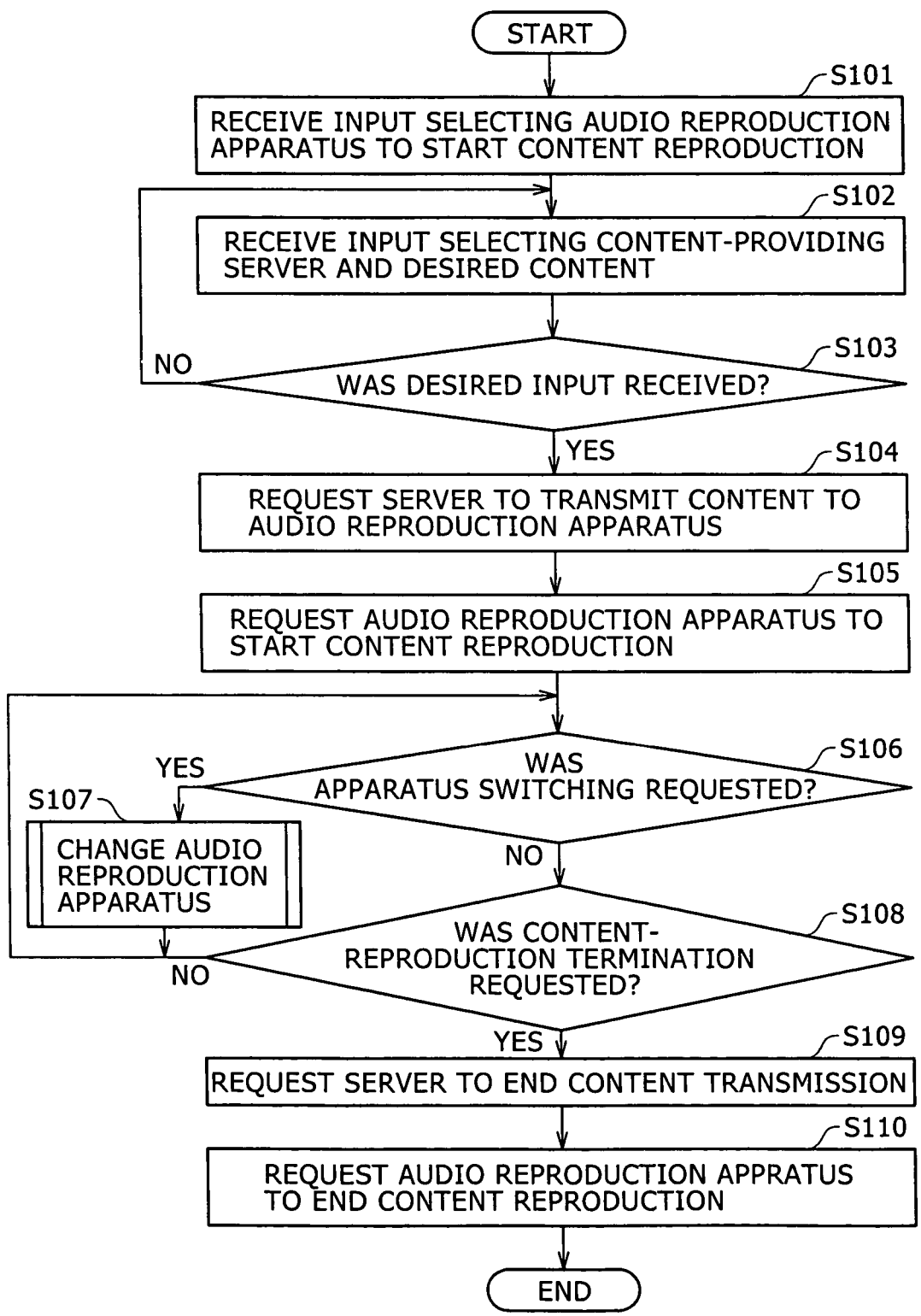
FIG. 8 shows a flowchart representing processing carried out by an audio reproduction apparatus functioning as a control point.

FIG. 8 shows a flowchart representing the processing carried out by the audio reproduction apparatus 3 functioning as a control point. When the power supply of the audio reproduction apparatus 3 is turned on, the control unit 50 executes a control application program for controlling the audio reproduction apparatus 3 as a whole. In the control application program, a U/I screen is displayed to the user and, in accordance with instructions shown on the U/I screen, the user operates input units such as the key operation unit 62 and the remote controller 70 to control operations of the audio reproduction apparatus 3.

In addition, at that time, functions of the audio reproduction apparatus 3 serving as a control point as well as a media renderer are also invoked. An example of these functions is execution of programs other than the control application program by a CPU employed in the communication unit 32. That is to say, another program executed to allow the audio reproduction apparatus 3 to function as a control point receives input information, which is entered by the user, through the control application program, controls operations carried out by the audio reproduction apparatus 3 functioning as a media renderer and controls operations carried out by a server functioning as a media server and other media renderers through the LAN 6. On the other hand, another program executed to allow the audio reproduction apparatus 3 to function as a media renderer controls an operation to reproduce an audio content in the audio reproduction apparatus 3 itself through the control application program in accordance with a control command issued by the control point.

Assume here for example that the control application program of an audio reproduction apparatus is executed in accordance with an operation input entered by the user to cause a transition to an operation mode in which the audio reproduction apparatus is capable of receiving an audio content transmitted by the server 1 or 2 by way of the LAN 6. In this case, the following processing is carried out.

The flowchart shown in FIG. 8 begins with a step S101 at which the audio reproduction apparatus 3 receives an input to select an audio reproduction apparatus to newly start an operation to reproduce an audio content. Since the audio reproduction apparatus 3 functioning as a control point knows what audio reproduction apparatus are connected to the network of the home network system, the user can enter the input to select an audio reproduction apparatus to newly start an operation to reproduce an audio content by typically referring to a list displayed on the display unit 64 as a list of selectable audio reproduction apparatus.

An audio reproduction apparatus actually receiving the input information, which is the audio reproduction apparatus 3 in the operations explained earlier by referring to FIG. 7, is assumed to be an audio reproduction apparatus supposed to reproduce an audio content. Thus, the audio reproduction apparatus 3 can be just set automatically as an audio reproduction apparatus to reproduce an audio content at a point of transition to the operation mode without requiring the user to specially select such an audio reproduction apparatus at the step S101.

Then, at the next step S102, the audio reproduction apparatus 3 receives an input to select a server to function as a source of the operation to transmit an audio content and select an audio content to be transmitted. As described above, the audio reproduction apparatus to newly start an operation to reproduce the selected audio content is the audio reproduction apparatus 3 itself. This audio reproduction apparatus 3 functioning as a control point has information on selectable media servers and is capable of obtaining information on audio contents stored in each of the media servers by execution of a CDS function. Thus, by execution of such a function, the audio reproduction apparatus to newly start an operation to reproduce the selected audio content is capable of displaying the names of the selectable media servers and the titles of the audio contents stored in each of the media servers on the display unit 64 in processing of the control application program. Accordingly, the user can enter the input to select a server to function as a source of the operation to transmit an audio content to be distributed by referring to the pieces of information displayed on the display unit 64.

Then, at the next step S103, the audio reproduction apparatus 3 determines whether or not the input received at the step S102 is an input to select a server to function as a source of the operation to transmit an audio content to be distributed. The user enters such an input by, for example, selecting icons displayed on the display unit 64. If the audio reproduction apparatus 3 determines that the input received at the step S102 is an input to select a server to function as a source of the operation to transmit an audio content to be distributed, the flow of the processing goes on to a step S104. If the audio reproduction apparatus 3 determines that the input received at the step S102 is not an input to select a server to function as a source of the operation to transmit an audio content to be distributed, on the other hand, the flow of the processing goes back to the step S102. At the step S102, the user is also allowed to change the input entered previously.

At the step S104, the audio reproduction apparatus 3 informs the server 1 serving as the selected media server of the selected audio content and the audio reproduction apparatus selected to newly start an operation to reproduce the selected audio content. In this case, the selected audio reproduction apparatus to newly start the operation to reproduce the selected audio content is the audio reproduction apparatus 3 itself as described above. As a result, the server 1 transmits the data of the audio content to the audio reproduction apparatus 3 by way of the LAN 6.

Then, at the next step S105, the audio reproduction apparatus 3 requests the audio reproduction apparatus for newly starting an operation to reproduce the selected audio content to start the reproduction. In this case, the selected audio reproduction apparatus to newly start an operation to reproduce the selected audio content is the audio reproduction apparatus 3 itself as described above. As a result, the communication unit 32 employed in the audio reproduction apparatus 3 receives the data of the audio content from the server 1 and passes on the data to an audio reproduction functional unit by way of the selector 37. The audio reproduction functional unit then reproduces a sound from the data.

Then, at the next step S106, the audio reproduction apparatus 3 determines whether or not an input to switch the operation to reproduce the audio content from the audio reproduction apparatus reproducing the audio content to another audio reproduction apparatus has been received. If the audio reproduction apparatus 3 determines that an input to switch the operation to reproduce the audio content from the audio reproduction apparatus reproducing the audio content to another audio reproduction apparatus has been received, processing of a step S107 is carried out. As an example of determination processing carried out at the step S106, the audio reproduction apparatus 3 displays an icon to be operated to switch the operation to reproduce the audio content from the audio reproduction apparatus reproducing the audio content to another audio reproduction apparatus on the display unit 64. If the user operates the icon, the audio reproduction apparatus 3 determines that a request has been made as a request for a process of switching the operation to reproduce the audio content from the audio reproduction apparatus 3 to another audio reproduction apparatus. If the audio reproduction apparatus 3 determines that an input to switch the operation to reproduce the audio content from the audio reproduction apparatus reproducing the audio content to another audio reproduction apparatus has not been received, on the other hand, the flow of the processing goes on to a step S108.

At the step S107, a subroutine for switching the operation to reproduce the audio content from the audio reproduction apparatus 3 to another audio reproduction apparatus is executed. This subroutine will be described later by referring to a flowchart shown in FIG. 9. When the execution of this subroutine is completed, the flow of the processing goes back to the step S106.

At the next step S108, the audio reproduction apparatus reproducing the audio content determines whether or not an input to terminate the reproduction operation has been received. As an example of the input to terminate the reproduction operation, the user operates a reproduction-end button provided on the key operation unit 62. If the audio reproduction apparatus reproducing the audio content determines that an input to terminate the reproduction operation has been received, the flow of the processing goes on to a step S109. If the audio reproduction apparatus reproducing the audio content determines that an input to terminate the reproduction operation was not received, on the other hand, the flow of the processing goes back to the step S106.

At the step S109, the audio reproduction apparatus reproducing the audio content requests the server 1 serving as a media server to terminate the operation to transmit the audio content to the audio reproduction apparatus. At this request made by the audio reproduction apparatus reproducing the audio content, the server 1 terminates the operation to transmit the audio content which was selected in the processing carried out at the step S102.

Then, at the next step S110, the audio reproduction apparatus reproducing the audio content is requested to terminate the operation to reproduce the audio content. If the audio reproduction apparatus 3 is reproducing the audio content, the audio reproduction apparatus 3 is capable of terminating the operation to reproduce the audio content. If processing was carried out at the step S107 to switch the operation to reproduce the audio content from the audio reproduction apparatus 3 to another audio reproduction apparatus, a function included in the other audio reproduction apparatus as a function of the control point can be used to specify the other audio reproduction apparatus itself as an audio reproduction apparatus to terminate the operation to reproduce the audio content. In addition, through the LAN 6, the audio reproduction apparatus 3 is capable of detecting a termination input entered to the other audio reproduction apparatus such as the audio reproduction apparatus 4 currently reproducing the audio content for example and terminating the operation being carried out by the audio reproduction apparatus 4 as the operation to reproduce the audio content in accordance with the detected termination input.

Figure 9:
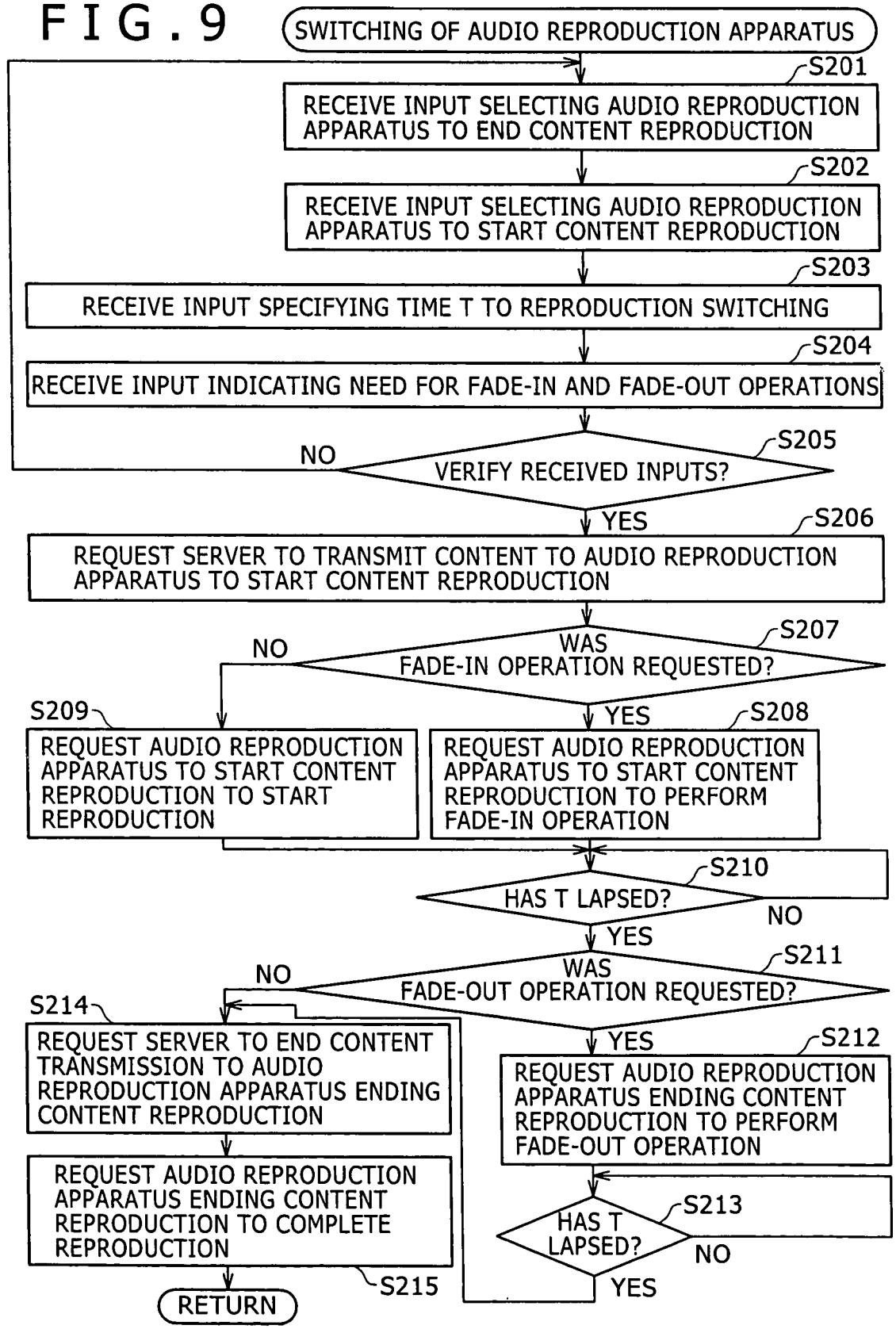
FIG. 9 shows a flowchart representing processing carried out by an audio reproduction apparatus functioning as a control point to switch an operation of reproducing an audio content to another audio reproduction apparatus.

FIG. 9 shows a flowchart representing the processing carried out by the audio reproduction apparatus 3 serving as a control point to switch the operation to reproduce an audio content from the audio reproduction apparatus 3 to another audio reproduction apparatus.

The flowchart begins with a step S201 at which an input specifying an audio reproduction apparatus as an audio reproduction apparatus to terminate the operation to reproduce an audio content is received. In the case of the operations shown in FIG. 7, the audio reproduction apparatus to terminate the operation to reproduce an audio content is assumed to be the audio reproduction apparatus 3 itself. Thus, at the step S201, the audio reproduction apparatus 3 is automatically specified as the audio reproduction apparatus to terminate the operation to reproduce an audio content without requiring the user to specially enter an input specifying an audio reproduction apparatus as an audio reproduction apparatus to terminate the operation to reproduce an audio content.

Then, at the next step S202, the audio reproduction apparatus 3 receives an input specifying an audio reproduction apparatus as an audio reproduction apparatus newly selected as an apparatus to start an operation of reproducing an audio content. In the case of the operations shown in FIG. 7, the audio reproduction apparatus 4 is designated as the audio reproduction apparatus newly selected as an apparatus to start the operation of reproducing an audio content. At the step S202, typically, a list of other audio reproduction apparatus connected to the network of the home network system is displayed on the display unit 64 and the user enters an input specifying an audio reproduction apparatus as an audio reproduction apparatus newly selected as an apparatus to start the operation of reproducing an audio content by selecting an audio reproduction apparatus from those included on the list. As an alternative, information identifying an audio reproduction apparatus designated before as an audio reproduction apparatus newly selected as an apparatus to start the operation of reproducing an audio content or information indicating an audio reproduction apparatus assumed to be an audio reproduction apparatus newly selected as an apparatus to start the operation of reproducing an audio content is stored in advance in the flash memory 55 and the audio reproduction apparatus indicated by the information can be designated automatically this time as an audio reproduction apparatus newly selected as an apparatus to start the operation of reproducing an audio content.

Then, at the next step S203, the audio reproduction apparatus 3 receives an input indicating a time duration T to the actual execution of the process of switching the operation to reproduce an audio content to the newly selected audio reproduction apparatus to start the operation of reproducing an audio content. The time duration T can be a minimum of 0.

Subsequently, at the next step S204, the audio reproduction apparatus 3 receives an input revealing whether or not fade-in and fade-out operations are to be carried out.

Then, the flow of the processing goes on to the next step S205 at which the audio reproduction apparatus 3 examines the inputs received at the steps S201 to S204 to verify that the inputs are a request to start a process of switching the operation to reproduce an audio content to an audio reproduction apparatus newly selected as an apparatus to start an operation of reproducing an audio content. For example, the user may make a request to change the inputs in some cases. In this case, the flow of the processing goes back to the step S201 to receive new inputs. If the result of the verification reveals that the inputs are a request to start a process of switching the operation to reproduce an audio content to the newly selected audio reproduction apparatus to start the operation of reproducing an audio content, the flow of the processing goes on to a step S206.

At the step S206, the audio reproduction apparatus 3 notifies the server 1 of the newly selected audio reproduction apparatus specified at the step S202 as an audio reproduction apparatus to start the operation of reproducing an audio content. The audio reproduction apparatus newly selected as an apparatus to start the operation of reproducing an audio content is the audio reproduction apparatus 4 in this case. In addition, the audio reproduction apparatus 3 requests the audio reproduction apparatus, which has been newly selected as an apparatus to start the operation of reproducing an audio content. As a result, the server 1 starts transmitting the audio content to the audio reproduction apparatus newly selected as an apparatus to start the operation of reproducing the audio content. It is to be noted that, at that time, the audio reproduction apparatus serving as the destination of the operation to transmit the audio content so far and the newly selected audio reproduction apparatus both receive the same audio content concurrently. In this example, the audio reproduction apparatus serving as the destination of the operation to transmit the audio content so far and the newly selected audio reproduction apparatus are the audio reproduction apparatus 3 and the audio reproduction apparatus 4 respectively as described above.

Then, at the next step S207, the audio reproduction apparatus 3 determines whether or not fade-in and fade-out operations have been specified at the step S204. If a result of determination reveals that fade-in and fade-out operations have been specified at the step S204, the flow of the processing goes on to a step S208. If the result of determination reveals that fade-in and fade-out operations were not specified at the step S204, on the other hand, the flow of the processing goes on to a step S209.

At the step S208, the audio reproduction apparatus 3 requests the newly selected audio reproduction apparatus, which is the audio reproduction apparatus 4 in this case, to start an operation of receiving and reproducing the audio content and, at the same time, start a fade-in operation. As requested by the audio reproduction apparatus 3, the audio reproduction apparatus 4 serving as the newly selected audio reproduction apparatus sets the volume of an output sound at 0 in an initial state, starts an operation to reproduce the received audio content and then reproduces the content while gradually increasing the volume of a generated sound till a determination result produced at the following step S210 reveals that the time duration T has lapsed. Then, the flow of the processing goes on to the step S210.

At the step S209, on the other hand, the audio reproduction apparatus 3 requests the newly selected audio reproduction apparatus, which is the audio reproduction apparatus 4 in this case, to start an operation of receiving and reproducing the audio content. As requested by the audio reproduction apparatus 3, the audio reproduction apparatus 4 serving as the newly selected audio reproduction apparatus starts the operation to reproduce the audio content received from the server 1. It is to be noted that, also in this case, the flow of the processing then goes on to the step S210 as well.

At the step S210, the audio reproduction apparatus 3 determines whether or not the time duration T has lapsed since the start of the step S206 by measuring the time duration T on the basis of a counting operation of a counter in a state of waiting for the time duration T to lapse. If the audio reproduction apparatus 3 determines that the time duration T has lapsed since the start of the step S206, the flow of the processing goes on to a step S211.

At the step S211, the audio reproduction apparatus 3 examines the input received at the step S204 to determine whether a fade-out operation has been requested. If the input received at the step S204 reveals that a fade-out operation has been requested, the flow of the processing goes on to a step S212. If the input received at the step S204 reveals that no fade-out operation has been requested, on the other hand, the flow of the processing goes on to a step S214.

At the step S212, the audio reproduction apparatus 3 requests the audio reproduction apparatus, which was selected at the step S201 as an audio reproduction apparatus to terminate the operation to reproduce an audio content, to start the fade-out operation. In this case, the audio reproduction apparatus selected at the step S201 as an audio reproduction apparatus to terminate the operation to reproduce an audio content is the audio reproduction apparatus 3 itself. As requested, the audio reproduction apparatus 3 serving as a media renderer gradually decreases the volume of a generated sound till a determination result produced at the following step S213 reveals that the time duration T has lapsed.

At the step S213, the audio reproduction apparatus terminating the operation to reproduce an audio content determines whether or not the time duration T has lapsed since the start of the step S212 by measuring the time duration T on the basis of a counting operation of a counter in a state of waiting for the time duration T to lapse. If the audio reproduction apparatus terminating the operation to reproduce an audio content determines that the time duration T has lapsed since the start of the step S212, the flow of the processing goes on to the step S214. It is to be noted that the time duration of the fade-out operation can be set at a value equal to or different from that of the fade-in operation.

At the step S214, the audio reproduction apparatus 3 requests the server 1 to end the operation to transmit the audio content to the audio reproduction apparatus terminating the operation to reproduce the audio content. In this case, the audio reproduction apparatus terminating the operation to reproduce the audio content is the audio reproduction apparatus 3 itself as described above. As requested by the audio reproduction apparatus 3, the server 1 ends the operation to transmit the audio content to the audio reproduction apparatus 3 but continues the operation to transmit the audio content to the audio reproduction apparatus 4 only.

Then, at the next step S215, the audio reproduction apparatus 3 requests the audio reproduction apparatus terminating the operation to reproduce an audio content to end the operation of reproducing the audio content. In this case, the audio reproduction apparatus terminating the operation to reproduce the audio content is the audio reproduction apparatus 3 itself as described above. Thus, only the audio reproduction apparatus newly designated as an audio reproduction apparatus to start the operation of reproducing an audio content continues the operation to reproduce the audio content. As described above, the audio reproduction apparatus newly designated as an audio reproduction apparatus to start the operation of reproducing an audio content is the audio reproduction apparatus 4 in this case.

As described above, in accordance with an operation input received from the user, the audio reproduction apparatus 3 functioning as a control point as well as a media renderer is capable of controlling an operation carried out by itself to reproduce an audio content, an operation carried out by a server to transmit the same audio content to another media renderer and an operation carried out by the other media renderer to reproduce the audio content. Thus, by merely carrying out an operation only on one audio reproduction apparatus, the user can continue listening to the same audio content in another room without an interruption.

Figure 10:
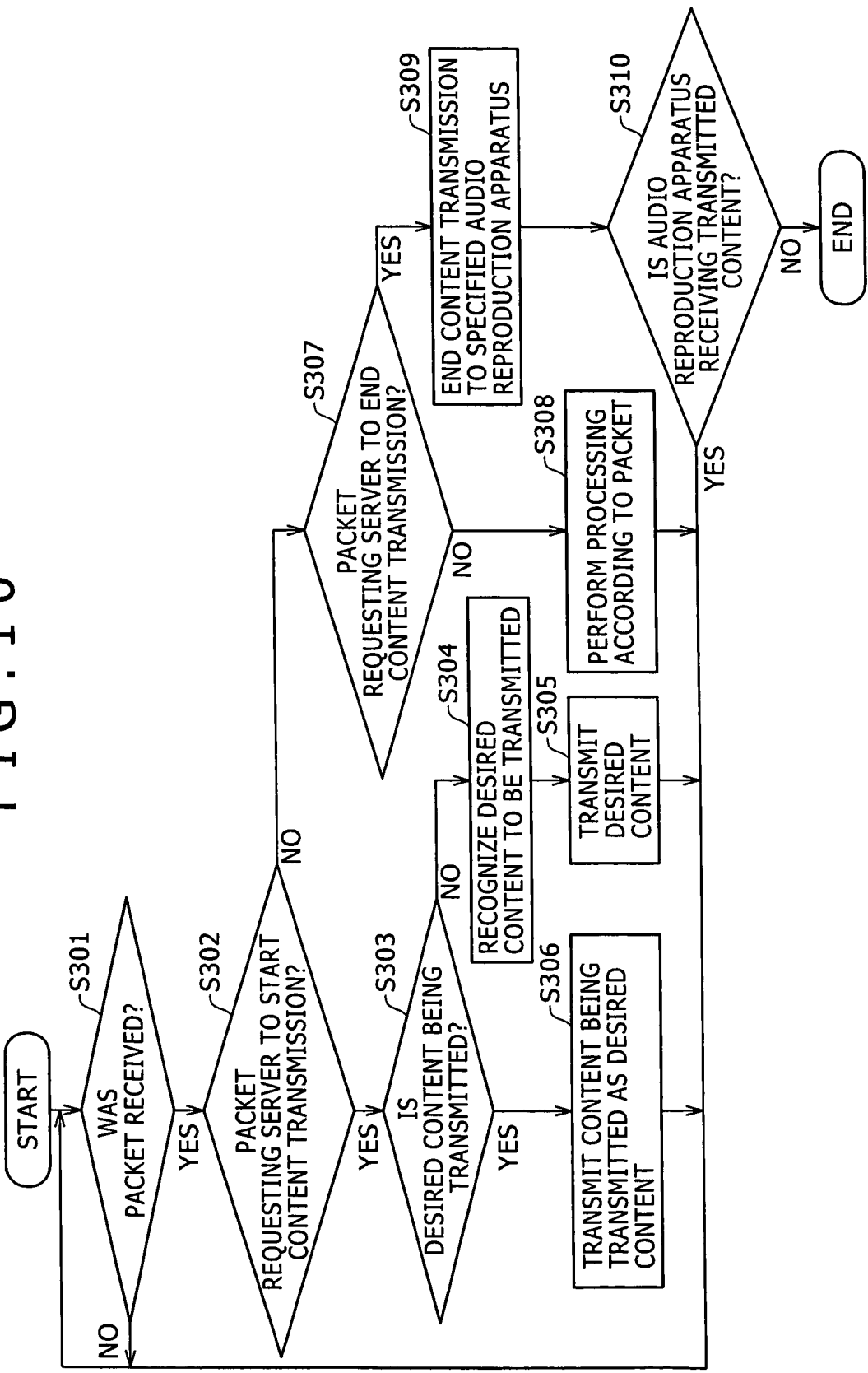
FIG. 10 shows a flowchart representing processing carried out by a server functioning as a media server.

Next, refer to FIG. 10 showing a flowchart representing processing carried out by the server 1, which functions as a media server.

In the server 1, the control unit 112 employed in the communication unit 12 executes a program allowing the server 1 to function as a media server. On the other hand, the control unit 14 executes a control application program for controlling the server 1 as a whole. The control unit 112 executes the program allowing the server 1 to function as a media server as requested by a control command received from a control point through the LAN 6 to carry out processing as an operation to read out a content from the HDD 13 through the control application program.

The flowchart begins with a step S301 at which the control unit 14 employed in the server 1 executes the control application program, invoking the function of a media server to monitor packets in the LAN 6 in order to determine whether a packet destined for the server 1 itself has been transmitted by a control point implemented by the audio reproduction apparatus 3 in this case. As a packet destined for the server 1 itself is received, the flow of the processing goes on to a step S302.

At the step S302, the server 1 examines the received packet to determine whether or not the packet is a packet requesting the server 1 to start the operation to transmit an audio content to an audio reproduction apparatus. If the server 1 determines that the packet is a packet requesting the server to start transmission of a desired audio content to an audio reproduction apparatus, the flow of the processing goes on to a step S303. If the server 1 determines that the packet is not a packet requesting the server to start transmission of a desired audio content to an audio reproduction apparatus, on the other hand, the flow of the processing goes on to a step S307.

At the step S303, the server 1 determines whether or not the server 1 itself is currently transmitting the desired audio content. If the server 1 determines that the server 1 itself is not currently transmitting the desired audio content, the flow of the processing goes on to a step S304. If the server 1 determines that the server 1 itself is currently transmitting the desired audio content, on the other hand, the flow of the processing goes on to a step S306.

At the step S304, the server 1 recognizes the desired audio content to be transmitted to the audio reproduction apparatus, which is specified in the packet received from the control point. To put it concretely, the server 1 fetches information identifying the desired audio packet from the packet.

Then, at the next step S305, the server 1 reads out the data of the desired audio content recognized at the step S304 from the HDD 13 and sequentially transmits the data to the audio reproduction apparatus specified in the packet by way of the LAN 6. In this case, the audio reproduction apparatus specified in the packet is the audio reproduction apparatus 3. Thus, the desired audio content is reproduced in the audio reproduction apparatus 3. Then, the flow of the processing goes back to the step S301 to enter a state of waiting for a packet specifying a transmission destination and a desired audio packet to be transmitted by a control point.

At the step S306, on the other hand, the server 1 transmits the same audio content as an audio content currently being transmitted at the same time to the audio reproduction apparatus specified in the packet received from the control point. It is to be noted that the server 1 transmits the same audio content to the destination audio reproduction apparatus with a synchronous transmission timing, which can be set by typically referring to a time code of the audio content. Then, the flow of the processing goes back to the step S301 to enter a state of waiting for a packet specifying a transmission destination and a desired audio packet to be transmitted by a control point.

Normally, the flow of the processing goes on from the step S303 to the steps S304 and S305 when the processing is carried out for the first time. For example, the audio reproduction apparatus serving as the destination of the process carried out at the steps S304 and S305 to transmit a desired audio content is the audio reproduction apparatus 3 functioning as a media renderer as described above. When audio reproduction apparatus 4 is specified newly as an audio reproduction apparatus to replace the audio reproduction apparatus 3 as explained earlier by referring to the operations shown in FIG. 7, the switching process is carried out again. For the switching process carried out this time, however, the flow of the processing goes on from the step S303 to the step S306 to transmit the same desired audio content also to the audio reproduction apparatus 4 at the same time so that the audio reproduction apparatus 3 and the audio reproduction apparatus 4 are capable of reproducing the audio content concurrently.

At the step S307, the server 1 examines the received packet to determine whether or not the received packet is a packet specifying an audio reproduction apparatus and requesting the server 1 to terminate current the operation to transmit an audio content to the specified audio reproduction apparatus. If the server 1 determines that the received packet is a packet specifying an audio reproduction apparatus and requesting the server 1 to terminate current the operation to transmit an audio content to the specified audio reproduction apparatus, the flow of the processing goes on to a step S309. If the server 1 determines that the received packet is not a packet specifying an audio reproduction apparatus and requesting the server 1 to terminate current the operation to transmit an audio content to the specified audio reproduction apparatus, on the other hand, the flow of the processing goes on to a step S308.

At the step S308, the server 1 carries out processing according to the received packet. Then, the flow of the processing goes back to the step S301 to enter a state of waiting for a packet specifying a transmission destination and a desired audio packet to be transmitted by a control point.

At the step S309, on the other hand, the server 1 terminates the current operation to transmit an audio content to the specified audio reproduction apparatus, which is the audio reproduction apparatus 3 in this case. Then, at the next step S310, the server 1 determines whether or not any audio reproduction apparatus is receiving a transmitted audio content. If the server 1 determines that an audio reproduction apparatus is receiving a transmitted audio content, the flow of the processing goes back to the step S301 to enter a state of waiting for a packet specifying a transmission destination and a desired audio packet to be transmitted by a control point. If the server 1 determines that no audio reproduction apparatus is receiving a transmitted audio content, on the other hand, the execution of the processing is ended.

By executing the processing described above, the server 1 functioning as a media server is capable of transmitting the same audio content to a plurality of audio reproduction apparatus each serving as a media renderer and switching the operation to transmit an audio content from one media renderer to another in accordance with a control command received from one of the media renderers, which are each an audio reproduction apparatus. Thus, the server 1 is capable of changing the destination of the operation to transmit an audio content under control executed by an audio reproduction apparatus, which usually serves as the content transmission destination. In addition, the server 1 may be requested to terminate the operation to transmit an audio content to an audio reproduction apparatus serving as a media renderer so far after a time duration has lapsed since the start of the operation to transmit the audio content to an audio reproduction apparatus newly designated as a media renderer. In this case, during the time duration, the same audio content is transmitted simultaneously to both the audio reproduction apparatus serving as a media renderer so far and the audio reproduction apparatus newly designated as a media renderer.

The following description explains transmission of the same audio content from a media server to a plurality of audio reproduction apparatus each serving as a media renderer at the same time in more detail. When the same audio content is transmitted to a plurality of audio reproduction apparatus, the media server is capable of making self adjustments so as to allow the audio reproduction apparatus to reproduce the audio content as synchronously as possible with a highest possible degree of accuracy. Typically, the media server is capable of transmitting the audio content to the audio reproduction apparatus by shifting timings to transmit the audio content to the audio reproduction apparatus in accordance with the characteristics of each of the audio reproduction apparatus and the environment for generating the audio content.

For example, the media server transmits a predetermined command to an audio reproduction apparatus, which serves as a destination of the operation to transmit an audio content, by executing a ping program and measures time lapsing since the operation to transmit the audio content till a response to the command is received from the audio reproduction apparatus. In this way, the media server is capable of obtaining the length of time it takes to propagate an audio content to the audio reproduction apparatus. On the basis of results of such measurements, the media server is capable of adjusting timings to transmit an audio content to audio reproduction apparatus so as to establish synchronization of operations carried out by the audio reproduction apparatus to reproduce the audio content. In this case, the media server is capable of compensating for reproduction synchronization shifts of the order of typically several milliseconds to several tens of milliseconds.

In addition, an audio content stored in a memory such as an HDD employed in a media server may be compressed data. In this case, prior to an operation to transmit the audio content to an audio reproduction apparatus, the media server reads out the audio data of the content from the memory, decodes the data of the content by decompressing the data and puts data obtained as a result of the decompression in a packet destined for the audio reproduction apparatus. Then, the media server outputs the packet to the LAN 6. In the process to put the audio content in a packet, typically, the media server activates a decode engine for each audio reproduction apparatus to receive the audio content and puts the content data obtained as a result of decode processing carried out by the decode engine in a packet destined for the audio reproduction apparatus associated with the decode engine. However, this method causes the media server to bear a heaviest processing load. In order to reduce the processing load, content data obtained as a result of decode processing carried out by a decode engine common to all audio reproduction apparatus is transmitted to each of the audio reproduction apparatus.

In addition, the processing to decode the audio data can be carried out in each audio reproduction apparatus. In this case, the processing load borne by the media server can be further reduced and the amount of data transmitted from the media server to the audio reproduction apparatus by way of the LAN 6 also becomes smaller as well.

Figure 11:
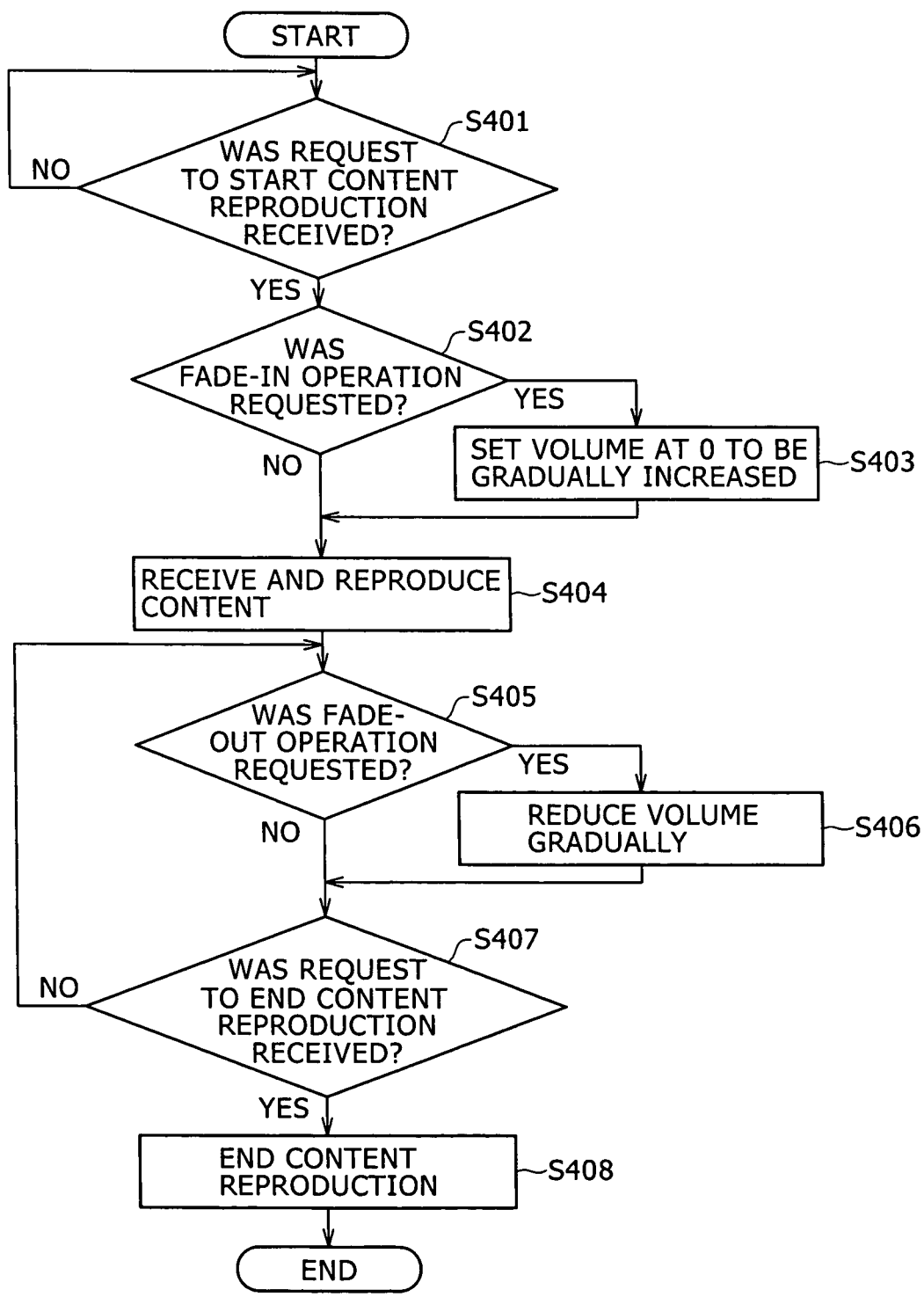
FIG. 11 shows a flowchart representing a processing procedure executed by an audio reproduction apparatus serving as a media renderer.

Next, refer to FIG. 11, which shows a flowchart representing a processing procedure executed by an audio reproduction apparatus serving as a media renderer. The flowchart shown in FIG. 11 also reveals processing functions to be provided to all the audio reproduction apparatus 3 to 5, which each serve as a media renderer. If each of the audio reproduction apparatus 3 to 5 is capable of executing such a processing procedure, it is possible to realize a process of switching an operation to reproduce an audio content from one audio reproduction apparatus to another.

An audio reproduction apparatus serving as a media renderer receives a control command from a control point through the LAN 6 as a command to start or end an operation to reproduce an audio content as well as a command to carry out a fade-in or fade-out operation. In the operations shown in FIG. 7, the audio reproduction apparatus 4 serving as a media renderer receives a control command from a control point through the LAN 6 as a command to start an operation of reproducing an audio content by carrying out a fade-in operation. On the other hand, the audio reproduction apparatus 3 serving as a media renderer receives a control command from a program executed to implement functions of a control point as a command to end an operation of reproducing an audio content by carrying out a fade-out operation.

The flowchart begins with a step S401 at which the audio reproduction apparatus enters a state of waiting for a command to be issued by a control point as a command to reproduce an audio content. As such a command is received, the flow of the processing procedure goes on to a step S402.

At the step S402, the audio reproduction apparatus determines whether or not the command also includes a request for a fade-in operation. If the command also includes a request for a fade-in operation, the flow of the processing procedure goes on to a step S403. If the command does not include a request for a fade-in operation, on the other hand, the flow of the processing procedure goes on to a step S404.

At the step S403, the audio reproduction apparatus sets the reproduction volume of the audio content at an initial value of 0, from which the volume is to be gradually increased. At the step S404, the audio reproduction apparatus receives the audio content from the server 1 and starts an operation to reproduce the content. Thus, if a fade-in operation is not specified in the command, the operation to reproduce the audio content is started immediately at the present set volume, for example.

Then, at the next step S405, the audio reproduction apparatus determines whether or not the command also includes a request for a fade-out operation. If the command also includes a request for a fade-out operation, the flow of the processing procedure goes on to a step S406. If the command does not include a request for a fade-out operation, on the other hand, the flow of the processing procedure goes on to a step S407.

At the step S406, the audio reproduction apparatus decreases the volume of the reproduced audio content gradually. At the step S407, the audio reproduction apparatus determines whether or not a command to end the operation of reproducing the audio content has been received from a control point. If the audio reproduction apparatus determines that a command to end the operation of reproducing the audio content has been received from a control point, the flow of the processing procedure goes on to a step S408. If the audio reproduction apparatus determines that a command to end the operation of reproducing the audio content has not been received from a control point, the flow of the processing procedure goes back to the step S405. It is to be noted that, if the determination result produced at the step S405 reveals that the command also includes a request for a fade-out operation, normally, a command to end the operation of reproducing the audio content is received from a control point after the lapse of time it takes to reduce the volume of the reproduced audio content gradually to 0.

At the step S408, the audio reproduction apparatus ends the operation to receive the audio content from the server 1 and the operation to reproduce the received content.

The processing described above is compared with the operations shown in FIG. 7 as follows. The process carried out at the step S401 corresponds to the operations carried out by the audio reproduction apparatus 4 serving as an apparatus, which is newly designated as an audio reproduction apparatus to start the operation of reproducing an audio content, to monitor a packet from the audio reproduction apparatus 3 serving as a control point and receive a command included in the packet as a command to start the operation of reproducing the audio content with a predetermined timing. The process carried out at the step S404 corresponds to the operations carried out by the audio reproduction apparatus 4 to receive the audio content from the server 1 and reproduce the received content. The process carried out at the step S402 corresponds to the operation carried out by the audio reproduction apparatus 4 to determine whether or not the command includes a request for a fad-in operation. The process carried out at the step S403 corresponds to the operation carried out by the audio reproduction apparatus 4 to set the reproduction volume of the audio content at an initial value of 0, from which the volume is to be gradually increased in the process carried out at the step S404.

In this case, the flow of the processing procedure goes on from the step S404 to the step S407 by way of the step S405, skipping the step S406. The process carried out at the step S407 corresponds to an operation carried out by the audio reproduction apparatus 4 to receive a command for ending the operation to reproduce the audio content in the audio reproduction apparatus 4 itself. The command is typically an operation input entered to the audio reproduction apparatus 3 to request the audio reproduction apparatus 3 serving as a control point to give a control command to the audio reproduction apparatus 4 to end the operation of reproducing the audio content in the audio reproduction apparatus 4. As an alternative, the control-point function of the audio reproduction apparatus 4 is used. In this case, the command is an operation input entered to the audio reproduction apparatus 4 itself as a command directly requesting the audio reproduction apparatus 4 to end the operation of reproducing the audio content in the audio reproduction apparatus 4.

By the way, the process carried out at the step S401 can also correspond to the operation carried out by the audio reproduction apparatus 3 serving as an audio reproduction apparatus, from which the operation to reproduce an audio content is to be switched to the audio reproduction apparatus 4, to detect a command received from the function of the control point of its own as a command to start the operation of reproducing the audio content. In this case, the flow of the processing procedure goes on from the step S401 to the step S404 by way of the step S402, skipping the step S403. The process carried out at the step S404 corresponds to the operations carried out by the audio reproduction apparatus 3 to receive the audio content from the server 1 and reproduce the received content. The process carried out at the step S405 corresponds to the operation carried out by the audio reproduction apparatus 3 to determine whether or not the command includes a request received from the control point as a request for a fad-out operation to be carried out for the duration of a predetermined time. The process carried out at the step S406 corresponds to the operation carried out by the audio reproduction apparatus 3 to gradually decrease the volume of the audio content being reproduced. The process carried out at the step S407 corresponds to the operation carried out by the audio reproduction apparatus 3 to receive a command from the control point as a command to terminate the operation to reproduce the audio content as the volume of audio content being reproduced becomes 0.

In either case, the process carried out at the step S408 corresponds to the operation carried out by the audio reproduction apparatus 4 or 3 to terminate the operation to reproduce the audio content.

As described above, not only is an audio reproduction apparatus serving as a media renderer capable of carrying out an operation to reproduce an audio content in accordance with an operation input entered by the user to the audio reproduction apparatus itself, but the audio reproduction apparatus also has the operation controlled by control information received from another apparatus existing in the home network system. Thus, by giving an operation to only one media renderer, it is possible to switch an operation to reproduce an audio content from one audio reproduction apparatus to another.

The following description is a supplementary description explaining fade-in and fad-out control. In order to request an audio reproduction apparatus to carry out a fade-in or fade-out operation, a control point issues a control command making a request for the fade-in or fade-out operation to the audio reproduction apparatus. Typically, the control command specifies the time duration of the fade-in or fade-out operation. This time duration corresponds to the time duration T shown in FIG. 9. Thus, the audio reproduction apparatus is capable of computing the increasing or decreasing speed of the volume from the present set volume and the time duration T, and increasing or decreasing speed the volume at the computed speed. In the case of a fade-in operation, a maximum volume may be specified from the control point.

As an alternative, the control point issues a control command to the audio reproduction apparatus as a command specifying a volume-increasing or decreasing speed computed by the control point. In this way, the audio reproduction apparatus is also capable of generating a sound with a volume varying with the lapse of time in the fade-in or fade-out operation.

As another alternative, the control point issues a control command to the audio reproduction apparatus as a command indicating whether or not a fade-in or fade-out operation is to be carried out. In this case, the audio reproduction apparatus finds an increasing or decreasing speed of the volume and a maximum volume by itself in dependence on the state of processing in the audio reproduction apparatus. Thus, the length of the fade-in or fade-out operation may not match the time duration T.

By carrying out the pieces of processing represented by the flowcharts shown in FIGS. 8 to 11, it is possible to perform a process of switching an operation to reproduce an audio content from one audio reproduction apparatus to another with a high degree of operatability. That is to say, the user merely sets a specific one of audio reproduction apparatus on which the process of switching the operation to reproduce an audio content is to be carried out and, when the process is implemented upon completion of a setting operation carried out by the user on the specific audio reproduction apparatus, the operation carried out by the audio reproduction apparatus newly designated as a media renderer to output the audio content is started. In the example described above, the audio reproduction apparatus from which the process of switching the operation to reproduce an audio content to another audio reproduction apparatus is carried out is the audio reproduction apparatus 3 whereas the audio reproduction apparatus newly designated as a media renderer to output the audio content is the audio reproduction apparatus 4. With the audio reproduction apparatus 3 set in this condition, when the user leaves a specific room in which the audio reproduction apparatus 3 is installed and moves to another room of the audio reproduction apparatus 4, the user can listen to the continuation of the audio content listened to so far. Then, as the time duration T lapses, the operation carried out by the audio reproduction apparatus 3 to reproduce the audio content in the specific room is ended automatically. Thus, the user needs only to operate the audio reproduction apparatus 3 before moving to the other room to be able to continue listening to the same audio content. As a result, convenience offered to the user is enhanced.

If neither fade-in operation nor fade-out operation is specified in the request to switch the operation to reproduce an audio content from one audio reproduction apparatus to another, the same audio content is reproduced in the specific and other rooms at the same time at a normal volume while the user is moving from the specific room to the other room. Thus, the user can continuously listen to the audio content in the natural sense without an interruption to the state of being able to hear the audio content. If both a fade-in operation and a fade-out operation are specified in the request, on the other hand, as the user leaves the specific room and approaches the other room, the volume of the audio content reproduced in the other room is increased gradually and, when the user is about to arrive at the other room, the volume of the audio content reproduced in the specific room is decreased, approaching 0. Thus, the user can continue listening to the audio content in a more natural sense.

[Typical Operations 2: Operating a Newly Designated Content Reproduction Apparatus to Change a Content Reproduction Apparatus in Operation]

By the way, the process of switching the operation to reproduce an audio content from an audio reproduction apparatus to another can be carried out in not only the audio reproduction apparatus currently reproducing the audio content, but also the audio reproduction apparatus to which the operation to reproduce the audio content is to be switched. As a conceivable example, the user desires to listen to an audio content, which is being reproduced in another room, as it is in a current room in which the user is present.

Figure 12:
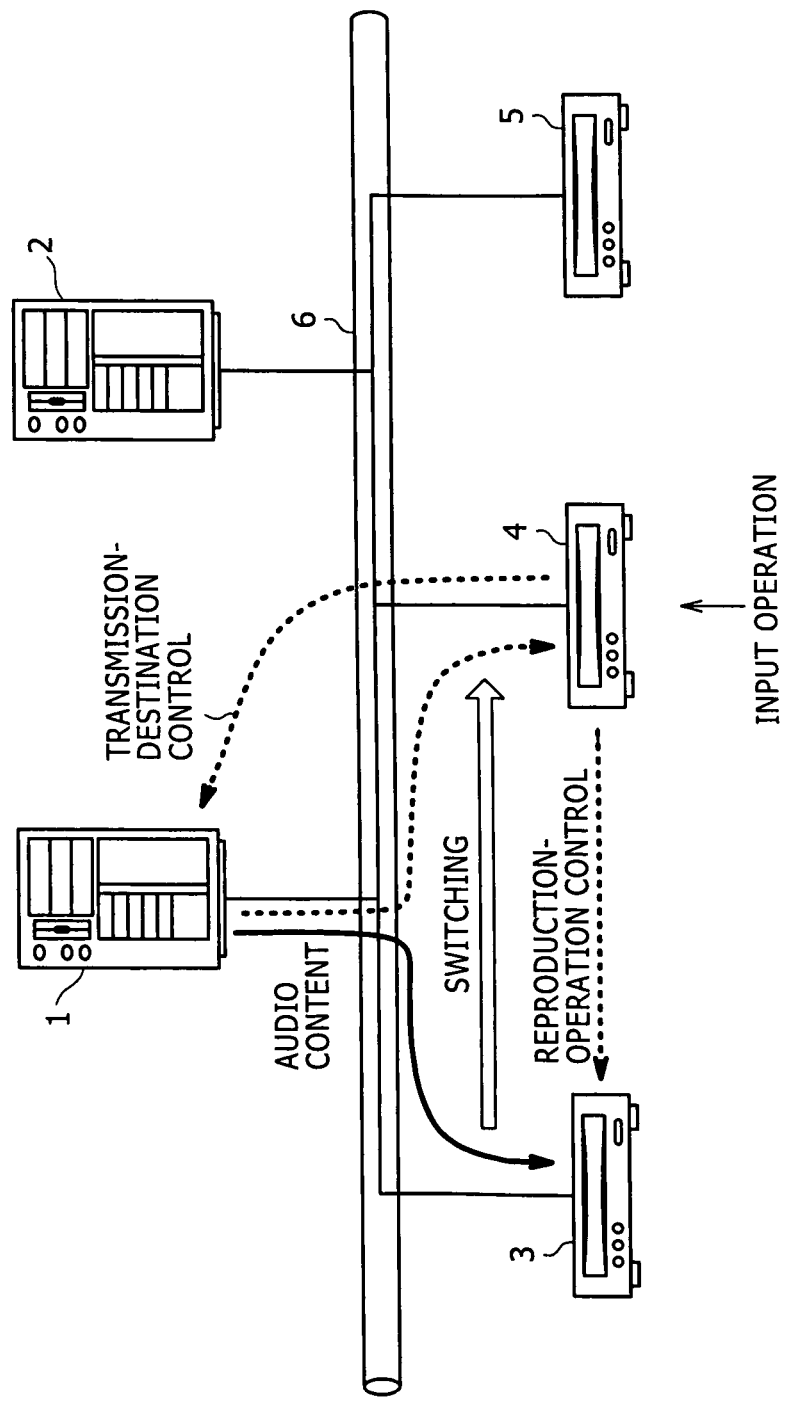
FIG. 12 is an explanatory diagram showing an outline of an operation, which is carried out in a whole home network system when an audio reproduction apparatus to be newly designated as an audio reproduction apparatus to reproduce an audio content is operated to switch an operation of reproducing the audio content from another audio reproduction apparatus.

FIG. 12 is an explanatory diagram showing an outline of operations carried out in the home network system for the above conceivable example.

In the example shown in FIG. 12, the audio reproduction apparatus 3 is receiving an audio content from the server 1 and reproducing the content. In this state, the users enters an operation input to the audio reproduction apparatus 4 to switch the reproduction content from the audio reproduction apparatus 3 to the audio reproduction apparatus 4 so as to allow the same audio content reproduced so far in the audio reproduction apparatus 3 to be reproduced continuously in the audio reproduction apparatus 4.

In such a case, much like typical operations 1 explained earlier, the server 1 functions as a media server whereas the audio reproduction apparatus 3 and 4 each function as a media renderer. In addition, each of the apparatus may have functions of a control point as functions for controlling an operation carried out by a server to transmit an audio content and an operation carried out by an audio reproduction apparatus to reproduce the content.

As an example, assume a case in which the audio reproduction apparatus 4 functions as a control point receiving an operation input. In this case, processing of control points in the apparatus, the media server and the media renderer can be implemented as the processing represented by the flowcharts shown in FIGS. 8 to 11. However, the audio reproduction apparatus 4 functioning as a control point controls a reproduction operation in the audio reproduction apparatus 3 through the LAN 6 while a reproduction operation carried out in the audio reproduction apparatus 4 itself is controlled internally. The server 1 functioning as a media server is controlled in accordance with a control packet received from the audio reproduction apparatus 4 to switch the operation to transmit an audio content from one transmission destination to another. It is to be noted that the server 1 can also be controlled by a control point in the audio reproduction apparatus 3 to transmit an audio content to the audio reproduction apparatus 3 at an initial time.

A concrete processing procedure for switching the operation to reproduce an audio content from the audio reproduction apparatus 3 to the audio reproduction apparatus 4 is explained as follows. First of all, the user enters an operation input to the audio reproduction apparatus 4 to newly designate the audio reproduction apparatus 4 itself as the destination of the operation to transmit the audio content. Receiving such an operation input, the audio reproduction apparatus 4 requests the server 1 to change the destination of the operation to transmit the audio content from the audio reproduction apparatus 3 to the audio reproduction apparatus 4. Then, the audio reproduction apparatus 4 starts the operation to reproduce the audio content in the audio reproduction apparatus 4 itself. In addition, the audio reproduction apparatus 4 requests the audio reproduction apparatus 3 to end the operation of reproducing the audio content. At that time, the timing to end the operation of reproducing the audio content in the audio reproduction apparatus 3 can be delayed from the timing to start the operation of reproducing the audio content in the audio reproduction apparatus 4. On the top of that, the audio reproduction apparatus 3 and 4 may be requested to carry out fade-out and fade-in operations respectively.

At the request made by the audio reproduction apparatus 4, the server 1 puts the data of the currently transmitted audio content in a packet destined for the audio reproduction apparatus 4 and outputs the packet to the LAN 6. At the same time, the server 1 ends an operation to transmit packets destined for the audio reproduction apparatus 3. In addition, in accordance with a control signal received from the audio reproduction apparatus 4, the audio reproduction apparatus 3 ends the operation to reproduce the audio content. Then, the audio reproduction apparatus 4 receives the data from the server 1 and starts the operation to reproduce the audio content represented by the data.

In the processing described above, the user is capable of switching the operation to reproduce an audio content from the audio reproduction apparatus 3 to the audio reproduction apparatus 4 and continuing to listen to a piece of music, which is reproduced in another room of the audio reproduction apparatus 3, as it is in a specific room in which the user is present by merely operating only the audio reproduction apparatus 4 located in the specific room. Thus, it is possible to switch the operation to reproduce an audio content from the audio reproduction apparatus 3 to the audio reproduction apparatus 4 with a high degree of operatability.

[Typical Operations 3: Operations for a Plurality of Apparatus Serving as Transmission Destinations and Switching Objects]

In the typical operations 1 and 2 described above, it is assumed that the operation to transmit an audio content is switched from a specific audio reproduction apparatus to another when the content is being transmitted to only the specific audio reproduction apparatus. However, the operation to transmit an audio content can also be switched from a specific audio reproduction apparatus to another when the content is being transmitted to a plurality of audio reproduction apparatus including the specific audio reproduction apparatus. In addition, a plurality of audio reproduction apparatus can each be newly designated as an audio reproduction apparatus to start an operation of reproducing an audio content or a plurality of audio reproduction apparatus can each be newly specified as an audio reproduction apparatus to end an operation of reproducing an audio content. As another alternative, a plurality of audio reproduction apparatus can each be newly designated as an audio reproduction apparatus to start an operation of reproducing an audio content and a plurality of audio reproduction apparatus can each be specified as an audio reproduction apparatus to end an operation of reproducing an audio content. In order to newly designate a plurality of audio reproduction apparatus each as an audio reproduction apparatus to start an operation of reproducing an audio content, a control point gives a command to each of the audio reproduction apparatus as a command to start an operation of reproducing the audio content. By the same token, in order to specify a plurality of audio reproduction apparatus each as an audio reproduction apparatus to end an operation of reproducing an audio content, a control point gives a command to each of the audio reproduction apparatus as a command to end an operation of reproducing the audio content. Since the function of the control point can be executed by any specific audio reproduction apparatus, by entering an operation input to the specific audio reproduction apparatus, it is possible to carry out the process of switching an operation to reproduce an audio content from one audio reproduction apparatus or a plurality of audio reproduction apparatus to another audio reproduction apparatus or a plurality of other audio reproduction apparatus.

Figure 13:
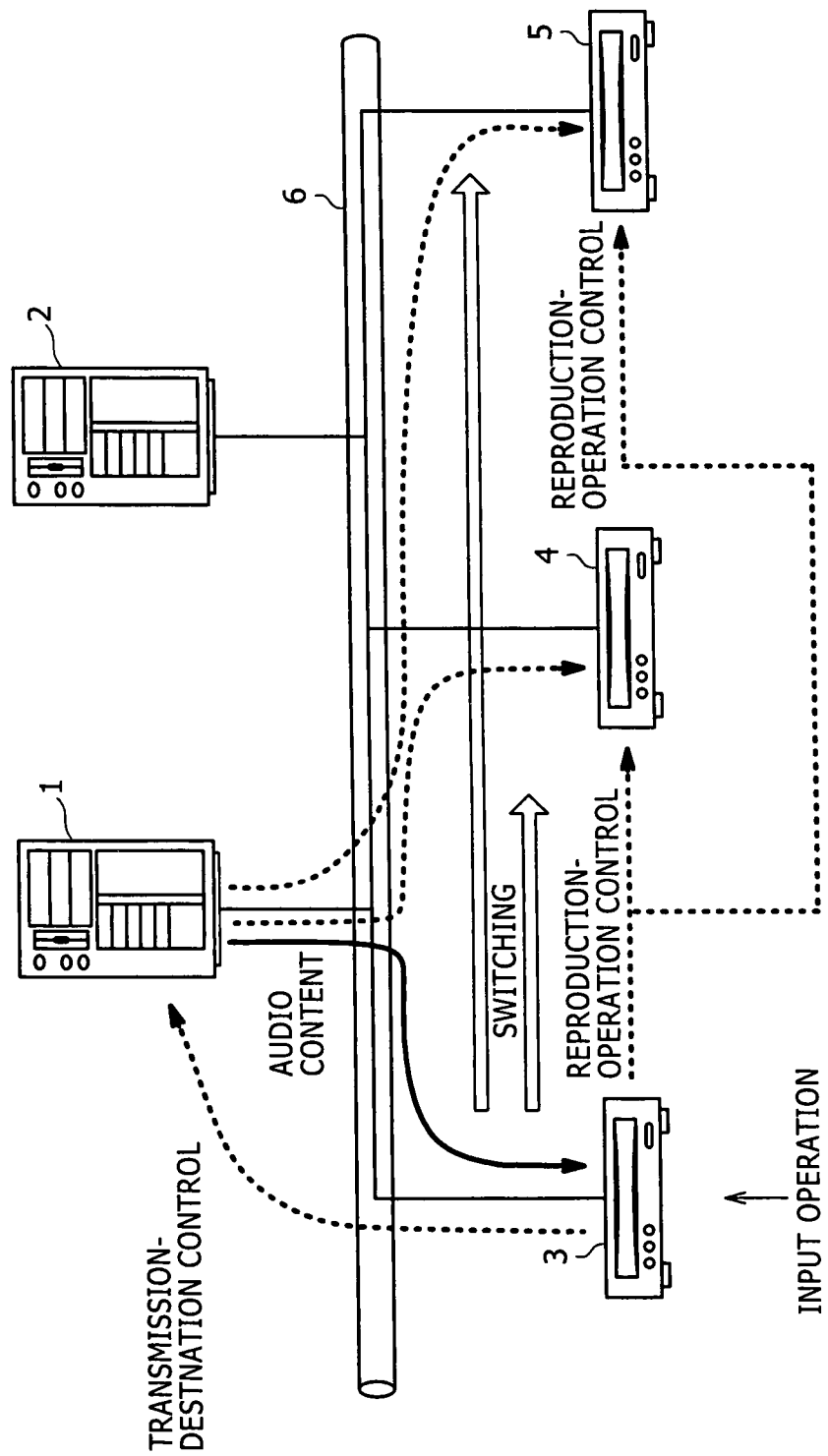
FIG. 13 is an explanatory diagram showing a typical process to switch an operation of reproducing an audio content from one audio reproduction apparatus to a plurality of other audio reproduction apparatus.

FIG. 13 is an explanatory diagram showing a typical process of switching an operation to reproduce an audio content from one audio reproduction apparatus to a plurality of other audio reproduction apparatus.

In the example shown in FIG. 13, while an audio content is being transmitted from the server 1 to the audio reproduction apparatus 3 and reproduced in the audio reproduction apparatus 3, the user enters an operation input to the audio reproduction apparatus 3 to newly designate a plurality of audio reproduction apparatus 4 and 5 each as a content transmission destination to start an operation of reproducing the same audio content, replacing the audio reproduction apparatus 3.

In this example, assume that the audio reproduction apparatus 3 serves as a control point. In this case, the following procedure is executed to switch an operation to reproduce an audio content from the audio reproduction apparatus 3 to the audio reproduction apparatus 4 and 5. First of all, the user enters an operation input to the audio reproduction apparatus 3 to newly designate the audio reproduction apparatus 4 and 5 each as a content transmission destination to start an operation of reproducing the same audio content, replacing the audio reproduction apparatus 3. Then, the audio reproduction apparatus 3 requests the server 1 to switch an operation to transmit an audio content from the audio reproduction apparatus 3 to the audio reproduction apparatus 4 and 5. Subsequently, the audio reproduction apparatus 3 requests the audio reproduction apparatus 4 and 5 to start an operation of reproducing the audio content and stops the operation carried out by the audio reproduction apparatus 3 itself to reproduce the audio content. At that time, the timing to end the operation of reproducing the audio content in the audio reproduction apparatus 3 can be delayed from the timing to start the operation of reproducing the audio content in the audio reproduction apparatus 4 and 5 and, in addition, fade-in and fade-out operations can be carried out during the delay time.

As requested by the audio reproduction apparatus 3, the server 1 puts the data of an audio content being transmitted to the audio reproduction apparatus 3 in a packet destined for the audio reproduction apparatus 4 and 5, and outputs the packet to the LAN 6. At the same time, the server 1 ends the operation to transmit the packet to the audio reproduction apparatus 3. In addition, the audio reproduction apparatus 4 and 5 each start an operation to reproduce the audio content in accordance with a control signal received from the audio reproduction apparatus 3 whereas the audio reproduction apparatus 3 ends the operation to reproduce the audio content. Thus, in the processing described above, by entering an operation input to the audio reproduction apparatus 3, the operation to reproduce the audio content can be switched from one audio reproduction apparatus 3 to a plurality of audio reproduction apparatus 4 and 5.

[Typical Screens for Selecting Switching Objects]

As described above, the user enters an operation input to select a specific audio reproduction apparatus as an apparatus to end an operation of reproducing an audio content and another audio reproduction apparatus as an apparatus to start an operation of reproducing the same audio content in order to switch the operation to reproduce the audio content from the specific audio reproduction apparatus to the other audio reproduction apparatus. A typical screen for allowing the user to enter an operation input for selecting the audio reproduction apparatus is explained as follows.

FIGS. 14 and 15 are each a diagram showing typical screens used for selecting audio reproduction apparatus each to serve as an object of switching. FIGS. 14 and 15 sequentially show screens used for selecting audio reproduction apparatus each to serve as an object of switching in accordance with select inputs entered by the user. If the user enters operation inputs to the audio reproduction apparatus 3, for example, the screens are displayed on the display unit 64 employed in the display unit 64. In this case, the user can enter the operation inputs by typically operating the up/down and left/right-direction keys provided on the key operation unit 62 and the remote controller 70.

As shown in the figures, the screen shows an apparatus display portion 641 and a function display portion 642. The apparatus display portion 641 is a list of the names of selectable audio reproduction apparatus. The function display portion 642 is an area for showing a selected function for an audio reproduction apparatus by using an icon. By operating up and down-direction keys, it is possible to change a focus position indicated by a shadowed block in the figure to the position of the name of any audio reproduction apparatus shown on the apparatus display portion 641. With the focus position coinciding with the position of the name of an audio reproduction apparatus, by operating the left and right-direction keys, the display state of the function display portion 642 can be changed to specify a function assigned to the audio reproduction apparatus. To put it concretely, for example, the audio reproduction apparatus can be designated as an audio reproduction apparatus to reproduce an audio content by operating the left and right-direction keys.

Figure 14A:
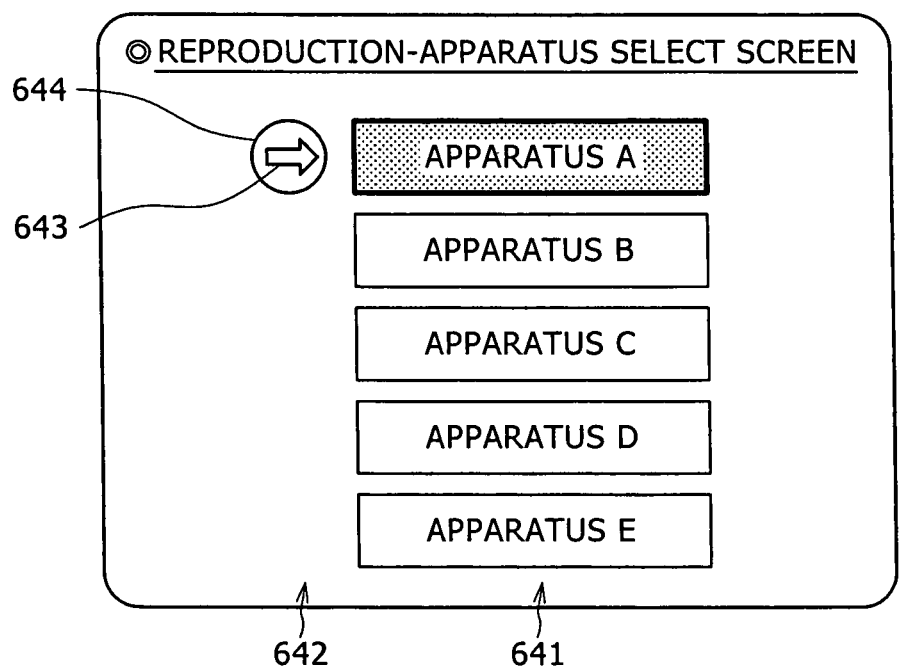
FIGS. 14A and 14B are first diagrams showing typical select screens for selecting audio reproduction apparatus to serve as switching objects.

The function display portion 642 shows an input-operation reception icon 643 having a shape resembling an arrow and a reproduction-apparatus icon 644 having a circular shape as shown in the figure. In addition, as shown in FIG. 14A, the input-operation reception icon 643 may be displayed, overlapping the reproduction-apparatus icon 644 in some cases. The input-operation reception icon 643 indicates that the audio reproduction apparatus indicated by the input-operation reception icon 643 is an audio reproduction apparatus to receive an operation input from the user. On the other hand, the reproduction-apparatus icon 644 is positioned at the location of an audio reproduction apparatus, which is presently reproducing an audio content or newly designated as an audio reproduction apparatus to start an operation of reproducing an audio content.

As an example, assume a process of switching an operation to reproduce an audio content from one audio reproduction apparatus to another by operating one of the audio reproduction apparatus. The following description explains an operation to select the apparatus to serve as objects of the switching in such an operation. In FIGS. 14 and 15, apparatus A and B are the audio reproduction apparatus 3 and 4 respectively. Much like the example shown in FIG. 7, it is assumed that the audio reproduction apparatus 3 reproducing an audio content is operated to switch the operation to reproduce the audio content from the audio reproduction apparatus 3 to the audio reproduction apparatus 4.

First of all, when the audio reproduction apparatus 3 is reproducing the audio content, in this initial state, the input-operation reception icon 643 and the reproduction-apparatus icon 644 are displayed at the position of apparatus A corresponding to the audio reproduction apparatus 3 as shown in FIG. 14A to indicate that the audio reproduction apparatus 3 is an audio reproduction apparatus to receive operation inputs from the user as well as an audio reproduction apparatus currently reproducing the audio content. With the focus position coinciding with the position of apparatus A, the display states of the input-operation reception icon 643 and the reproduction-apparatus icon 644 on the function display portion 642 can be changed by operating the left and right-direction keys. It is to be noted that, since the audio reproduction apparatus 3 is assumed to be an audio reproduction apparatus to receive operation inputs from the user, the input-operation reception icon 643 is not moved from its position.

Figure 14B:
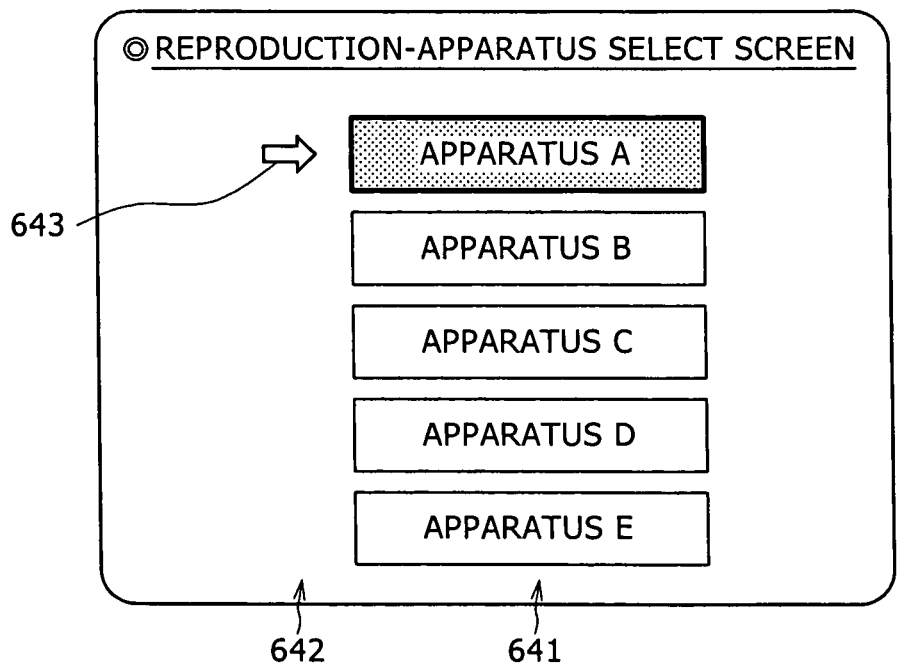

In order to specify the audio reproduction apparatus 3 as an audio reproduction apparatus to terminate the operation to reproduce the audio content, the left and right-direction keys are operated to delete the reproduction-apparatus icon 644 beside apparatus A as shown in FIG. 14B. It is to be noted that the audio reproduction apparatus does not actually carries out the requested operation till a confirm key is pressed.

Figure 15A:
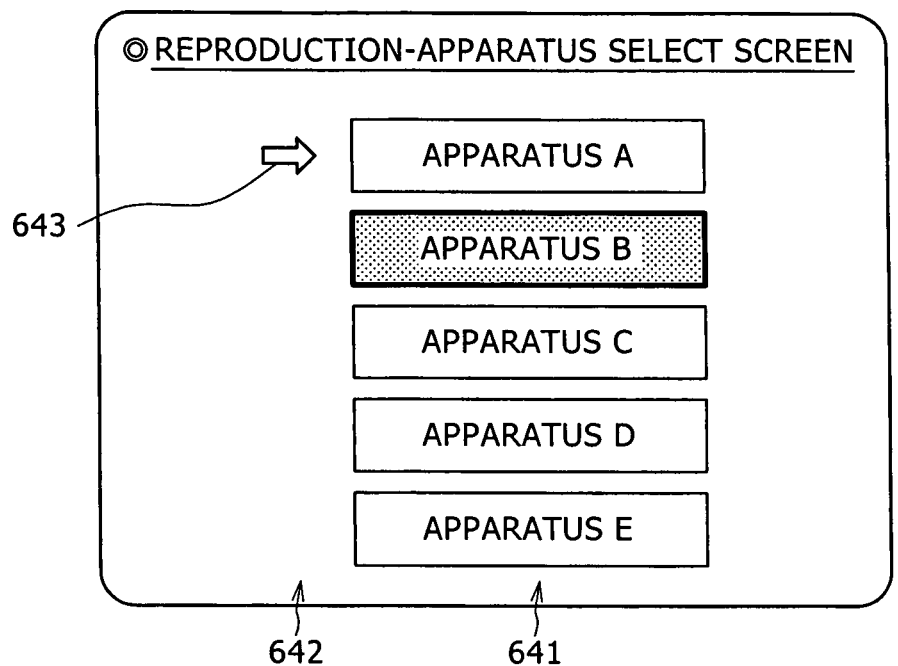
FIGS. 15A and 15B are second diagrams showing typical select screens for selecting audio reproduction apparatus to serve as switching objects.
Figure 15B:
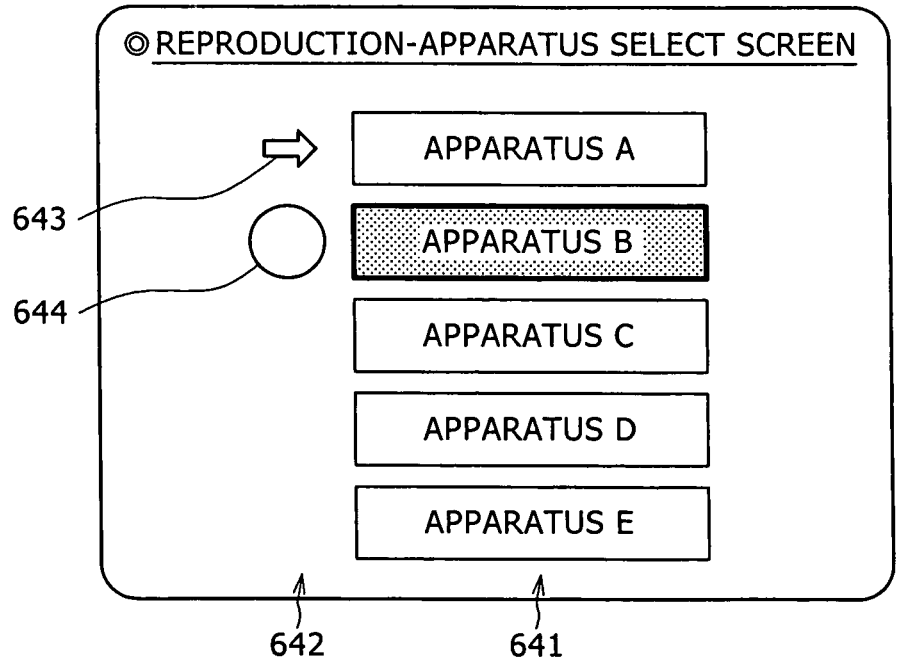

Next, in order to newly designate the audio reproduction apparatus 4 as an audio reproduction apparatus to start an operation of reproducing the audio content, the up and down-direction keys are operated to change the focus position in the apparatus display portion 641 to the position of apparatus B as shown in FIG. 15A. Then, the left and right-direction keys are operated to display the reproduction-apparatus icon 644 beside apparatus B as shown in FIG. 15B. With the reproduction-apparatus icon 644 displayed beside apparatus B as shown in FIG. 14B, apparatus B is newly designated as an audio reproduction apparatus to start an operation of reproducing the audio content.

Then, as the confirm key is pressed, the selection of the audio reproduction apparatus 3 as an audio reproduction apparatus to end the operation of reproducing the audio content and the designation of the audio reproduction apparatus 4 as an audio reproduction apparatus to newly start an operation to reproduce the audio content are confirmed. Subsequently, the audio reproduction apparatus 3 requests the server 1 to start an operation to transmit the audio content to the audio reproduction apparatus 4 and requests the audio reproduction apparatus 4 to start an operation of reproducing the audio content. For example, the audio reproduction apparatus 3 requests the server 1 to start an operation to transmit the audio content to the audio reproduction apparatus 4 at the step S206 of the flowchart shown in FIG. 9, and requests the audio reproduction apparatus 4 to start an operation of reproducing the audio content at the step S208 or S209 of the same flowchart. Then, the audio reproduction apparatus 3 requests the server 1 to end the operation to transmit the audio content to the audio reproduction apparatus 3 and ends the operation to reproduce the audio content. For example, the audio reproduction apparatus 3 requests the server 1 to end the operation to transmit the audio content to the audio reproduction apparatus 3 at the step S212 of the same flowchart and ends the operation to reproduce the audio content at the step S213 of the same flowchart.

The procedure for selecting audio reproduction apparatus as shown in FIGS. 15 and 16 can be applied to a case in which an audio reproduction apparatus receiving operation inputs from the user is newly designated as an audio reproduction apparatus to start an operation of reproducing an audio content as well as a case in which a plurality of audio reproduction apparatus are each specified as an audio reproduction apparatus to end an operation of reproducing an audio content and a plurality of audio reproduction apparatus are each specified as an audio reproduction apparatus to start an operation of reproducing the audio content. As described above, the reproduction-apparatus icon 644 is erased from a position to indicate that the audio reproduction apparatus beside the position is specified as an audio reproduction apparatus to end an operation of reproducing an audio content and the reproduction-apparatus icon 644 is newly displayed at a position to indicate that the audio reproduction apparatus beside the position is newly designated as an audio reproduction apparatus to start an operation of reproducing an audio content.

[Automatic Selection of Audio Reproduction Apparatus as Switching Objects]

The processing to specify an audio reproduction apparatus as an audio reproduction apparatus to end an operation of reproducing an audio content and newly designate an audio reproduction apparatus as an audio reproduction apparatus to start an operation of reproducing an audio content as described above can be carried out automatically by calling information set in advance as information identifying the audio reproduction apparatus selected as objects of switching. For example, information on audio reproduction apparatus is stored in advance in a memory to be called later and supplied to a control point. The stored information is information identifying an audio reproduction apparatus arbitrarily specified by the user as an audio reproduction apparatus to end an operation of reproducing an audio content, an audio reproduction apparatus newly designated in an arbitrary manner by the user as an audio reproduction apparatus to start an operation of reproducing an audio content, an audio reproduction apparatus specified by the user in an immediately previous selection process as an audio reproduction apparatus to end an operation of reproducing an audio content and an audio reproduction apparatus newly designated in an immediately previous selection process by the user as an audio reproduction apparatus to start an operation of reproducing an audio content.

FIG. 16 shows a typical table used by an audio reproduction apparatus specified as a switching object to end an operation of reproducing an audio content as a table showing audio reproduction apparatus each to be newly designated as a switching object to start an operation of reproducing the audio content. To be more specific, FIG. 16 shows a typical table stored in an audio reproduction apparatus, which is specified as a switching object to end an operation of reproducing an audio content, as a table showing audio reproduction apparatus each to be newly designated as a switching object to start an operation of reproducing the audio content. This typical table is a table used for storing both set information 551*a* on an audio reproduction apparatus, which was newly designated as a switching object to start an operation of reproducing an audio content in an immediately previous switching process, and information 551*b* on audio reproduction apparatus set by users as audio reproduction apparatus each to be newly designated as a switching object to start an operation of reproducing an audio content. Thus, when an operation input making a request for switching of an operation to reproduce an audio content, an audio reproduction apparatus set in the table can be used as an audio reproduction apparatus to be newly designated as a switching object to start the operation of reproducing an audio content.

In this typical table, the information on an audio reproduction apparatus to be newly designated as a switching object to start an operation of reproducing an audio content includes the newly designated apparatus 552 in switching of the audio reproduction apparatus, a MAC (Media Access Control) address 553, a switching duration 554 and a flag 555. The MAC address 553 is an address used for identifying the audio reproduction apparatus. The switching duration 554 is the length of time it takes to carry out the switching operation. The flag 555 is a flag indicating whether or not fade-in and fade-out operations are to be carried out. If a plurality of audio reproduction apparatus are each specified as an audio reproduction apparatus to be newly designated as a switching object to start an operation of reproducing an audio content, the information 551*b* is set as information including the newly designated apparatus 552 in switching of the audio reproduction apparatus and their MAC addresses 553.

Typically, this table is stored in the flash memory 55 employed in the audio reproduction apparatus such as the audio reproduction apparatus 3. When an audio reproduction apparatus is specified as an audio reproduction apparatus to be newly designated as a switching object to start an operation of reproducing an audio content at, for example, the steps S201 to S204 of the flowchart shown in FIG. 9, the pieces of information are read out from the table and used as a base of a displayed select screen. Then, by referring to the displayed select screen, the user can enter an input selecting ones of the audio reproduction apparatus. In addition, the set information 551*a* on an audio reproduction apparatus, which was newly designated as a switching object to start an operation of reproducing an audio content in an immediately previous switching process, is updated at a point of time the select input entered by the user is confirmed for example when a determination result produced at the step S205 of the flowchart shown in FIG. 9 reveals that the input is verified to be a correct input.

The processing to read out information from the table and update the set information 551*a* is typically carried out by execution of a control application program for a process of presenting a U/I (user interface) or a program for implementing a function of a control point. If the processing is carried out by execution of a control application program for a process of presenting a U/I, for example, the pieces of information are read out from the table and used as a base of a displayed select screen. Then, by referring to the displayed select screen, the user can enter an input selecting ones of the audio reproduction apparatus. In this case, the selected information is supplied to a control point to inform the control point of a selected audio reproduction apparatus. In addition, at this point of time, the set information 551*a* is updated on the basis of the selected information. Thus, in this processing, the user can carry out a process to switch an operation to reproduce an audio content from an audio reproduction apparatus to another by carrying out a simple input operation.

It is to be noted that the table described above may include descriptions of devices provided in each audio reproduction apparatus specified as a switching object to end an operation of reproducing an audio content and each audio reproduction apparatus to be newly designated as a switching object to start an operation of reproducing an audio content. In addition, the table may include descriptions of services rendered by each of the audio reproduction apparatus, information on contents (such as album information and track information) to be distributed and an IP address for identifying each of the audio reproduction apparatus.

[Limitations on Control Points Capable of Controlling Media Renderers]

As described above, in this embodiment, all apparatus connected to the LAN 6 are capable of functioning as a control point. In consequence, in the course of a process to switch an operation to reproduce an audio content from one audio reproduction apparatus to another, a control point other than a control point controlling this switching process may generate a control signal to a specific audio reproduction apparatus being subjected to the switching process in some cases. It is undesirable to have a reproduction operation of such a specific audio reproduction apparatus controlled by a control signal generated by the other control point in the course of a process to switch an operation to reproduce an audio content.

It is thus desirable to provide an audio reproduction apparatus receiving an operation input and an audio reproduction apparatus serving as an object of a switching process with a function to reject a control signal transmitted by another control point during at least a period between the start of the operation input to switch an operation to reproduce an audio signal from one audio reproduction apparatus to another and the end of the switching operation. To put it concretely, for example, an audio reproduction apparatus serving as an object of the switching process holds information identifying a controlling audio reproduction apparatus and, when the audio reproduction apparatus serving as an object of the switching process receives control information from an audio reproduction apparatus other than the controlling audio reproduction apparatus in the course of the switching process, the audio reproduction apparatus serving as an object of the switching process just discards a request based on this control information and merely informs the audio reproduction apparatus other than the controlling audio reproduction apparatus that the request has been discarded.

[Others]

A computer is capable of implementing the processing functions of a control point, a media server and a media renderer, which are employed in the embodiment. In this case, programs are used for prescribing the contents of processing of the functions that an audio reproduction apparatus and a server should have. The computer executes the program to carry out the processing. The programs used for prescribing the substance of the processing can be stored in advance in a recording medium that can be read by the computer. Examples of the recording medium are a magnetic recording medium, an optical disk, a magneto-optical disk and a semiconductor memory.

The programs are delivered to users by storing the programs in portable recording mediums such as semiconductor memories and selling the portable recording mediums to the users. As an alternative, the programs are stored in advance in a storage unit employed in a computer of a server to be distributed to other computers from the computer of the server by way of the network.

A computer for executing the programs install the programs from typically the portable recording medium or the network in case the programs are distributed from the server into a storage unit of the computer itself. Then, the computer reads out a program from the storage unit of the computer itself and executes the program to carry out processing. It is to be noted that the computer is also capable of executing the program by reading out the program directly from the portable recording medium.

In addition, in the embodiment described above, a server has only the function of a media server. However, the server can also include the function of a media renderer besides the function of a media server. In this case, the server can be specified as an audio reproduction apparatus to newly start an operation of reproducing an audio content or an audio reproduction apparatus to end an operation of reproducing the audio content in a process to switch reproduction of a content from the audio reproduction apparatus to end the reproduction of the content to the audio reproduction apparatus to newly start reproduction of the same content.

Furthermore, a content distributed by a media server to be reproduced by a media renderer can be information such as a video content, a still-picture content or a text content such news besides an audio content described above.

Moreover, the embodiment applies the present invention to a home network system conforming to the conforming to the UPnP (Universal Plug & Play) specifications. However, the present invention can also be applied to other network systems conforming to Jini (Java (a trademark) intelligent network infrastructure) or HAVi (Home Audio/Video interoperability) specifications. That is to say, the present invention can be applied to a variety of network systems each including servers each functioning as a provider of a variety of contents such as an audio content and clients each receiving a content from a server and sequentially reproducing the content.

While the preferred embodiments of the present invention have been described using specific embodiments, such description is for illustrative purposes only, and it is to be understood that changes and variations may be made without departing from the spirit or scope of the appended claims.

What is claimed is:

1. An information control method adopted in an information reproduction system comprising at least one information-provision apparatus and a plurality of information reproduction apparatuses each used for reproducing information received from said information-provision apparatus, said information control method comprising the steps of:

letting one of said information reproduction apparatuses request said information-provision apparatus to transmit a predetermined content data item to a first one of said information reproduction apparatuses by transmitting pieces of information to said information-provision apparatus as content identification information used for identifying said predetermined content data item and apparatus identification information used for designating said first information reproduction apparatus as an information reproduction apparatus to receive said predetermined content data item transmitted by said information-provision apparatus, said predetermined content data item comprising first and second portions, the first portion being designated for reproduction prior to the second portion;

letting said information-provision apparatus transmit said predetermined content data item to said first information reproduction apparatus;

letting said first information reproduction apparatus reproduce said predetermined content data item;

letting said first information reproduction apparatus request said information-provision apparatus to transmit said predetermined content data item to a different information reproduction apparatus of said plurality of information reproduction apparatuses by transmitting apparatus identification information to said information-provision apparatus as information designating said different information reproduction apparatus as a second information reproduction apparatus to newly receive said predetermined content data item transmitted by said information-provision apparatus, said request occurring as reproduction of the first portion of said predetermined content data item completes;

letting said information-provision apparatus start transmitting the second portion of said predetermined content data item to said second information reproduction apparatus;

letting said second information reproduction apparatus reproduce the second portion of said predetermined content data item; and ending an operation to transmit said predetermined content data item to said first information reproduction apparatus in response to a predetermined period of time having lapsed since a start of an operation to transmit said content data item to said second information reproduction apparatus.

2. The information control method according to claim 1, wherein, at said step of letting said information-provision apparatus start transmitting said predetermined content data item to said second information reproduction apparatus, said information-provision apparatus further ends said step of transmitting said predetermined content data item to said first information reproduction apparatus and ending an operation to transmit said predetermined content data item to said first audio reproduction apparatus, said first audio reproduction apparatus ends an operation to reproduce said content data item.

3. The information control method according to claim 2, said information control method further including the step of storing apparatus identification information used for newly designating said second information reproduction apparatus and identifying said first information reproduction apparatus as an information reproduction apparatus to terminate an operation of reproducing said content data item,
wherein said content data item is transmitted to said second information reproduction apparatus and an operation to transmit said content data item to said first information reproduction apparatus is ended on the basis of said stored apparatus identification information.

4. The information control method according to claim 2, wherein said first information reproduction apparatus ends the operation to reproduce said content data item comprises by fading out its output when said information-provision apparatus ends said step of transmitting said content data item to said first information reproduction apparatus.

5. The information control method according to claim 1, wherein, at said step of letting said second information reproduction apparatus reproduce the second portion of said predetermined content data item, said second information reproduction apparatus fades in its output.

6. The information control method according to claim 1, wherein said predetermined period of time used at said step of ending an operation to transmit said content data item to said first information reproduction apparatus is set in an operation input entered by the user.

7. An information reproduction system comprising at least one information-provision apparatus and a plurality of information reproduction apparatuses each used for reproducing information received from said information-provision apparatus wherein
said information-provision apparatus comprises at least one hardware processor programmed to implement:
a presentation-request acceptance section for accepting a request to start an operation of providing a content data item to a first information reproduction apparatus of said plurality of information reproduction apparatuses, said content data item comprising first and second portions, the first portion being designated for reproduction prior to the second portion;
an information-providing section for carrying out said operation to provide the content data item to said first information reproduction apparatus in accordance with said request; and
a content-recipient modification section for accepting a request from the first information reproduction apparatus, after reproduction of the first portion of said content data item by said first information reproduction apparatus completes, to change a recipient of said content data item from said first information reproduction apparatus to a second information reproduction apparatus different than said first information reproduction apparatus, wherein said changing causes said information-providing section to provide the second portion of said content data item to said second information reproduction apparatus to continue reproduction of said content data item; whereas
each of said plurality of information reproduction apparatuses comprises at least one hardware processor programmed to implement:
a reproduction section for reproducing a content data item; and
a recipient designation section for requesting said information-provision apparatus to transmit a predetermined content data item to a different one of said information reproduction apparatuses by transmitting pieces of information to said information- provision apparatus as content identification information used for identifying said predetermined content data item and apparatus identification information used for designating said different information reproduction apparatus as an information reproduction apparatus to receive said predetermined content data item, after reproduction of the first portion of the first portion of said content data item by said information reproduction apparatus completes, and to reproduce the second portion of said predetermined content data item, said request to transmit said predetermined content data item to said different information reproduction apparatus specifying that said different information reproduction apparatus is to fade in its output;
wherein said information-providing section of said information-provision apparatus is further for ending an operation to transmit said content data item to said information reproduction apparatus in response to a predetermined period of time having lapsed since a start of an operation to provide said content data item to said different information reproduction apparatus.

8. The information reproduction system according to claim 7, wherein each of said information reproduction apparatuses further includes a reproduction control section for controlling an operation to reproduce content data item transmitted by said information-provision apparatus in said information reproduction apparatus.

9. An information-provision apparatus for providing a content data item to a plurality of information reproduction apparatuses each used for reproducing said content data item received from said information-provision apparatus, said information-provision apparatus comprising at least one hardware processor programmed to implement:
a presentation-request acceptance section for accepting a request to start an operation to provide a content data item to any first one of said information reproduction apparatuses, the content data item comprising first and second portions, the first portion being designated for reproduction prior to the second portion;
an information-providing section for carrying out said operation to provide the content data item to said first information reproduction apparatus in accordance with said request; and
a content-recipient modification section for accepting a request from said first information reproduction apparatus, after reproduction of the first portion of said content data item by said first information reproduction apparatus completes, to change a recipient of said content data item from said first information reproduction apparatus to a at least one second information reproduction apparatus different than said first information reproduction apparatus, so that said information-providing section provides the second portion of said content data item to said at least one second information reproduction apparatus to reproduce the second portion of said content data item;

wherein said information-providing section is further for ending an operation to transmit said content data item to said first information reproduction apparatus in response to a predetermined period of time having lapsed since a start of an operation to transmit said content data item to each at least one second information reproduction apparatus designated as a recipient of said content data.

10. An information reproduction apparatus for reproducing a content data item received from an information-provision apparatus, said information reproduction apparatus comprising at least one hardware processor programmed to implement:

a reproduction section for reproducing a content data item, the content data item comprising first and second portions, the first portion being designated for reproduction prior to the second portion;

a recipient designation section for requesting said information-provision apparatus to transmit a predetermined content data item to a first information reproduction apparatus by transmitting pieces of information to said information-provision apparatus as content identification information used for identifying said predetermined content data item and apparatus identification information used for designating said first information reproduction apparatus as an information reproduction apparatus to receive said predetermined content data item, and for requesting, after reproduction of the first portion of said content data item by said first information reproduction apparatus completes, said information- provision apparatus to transmit said predetermined content data item to a second information reproduction apparatus, different than the first information reproduction apparatus, by transmitting apparatus identification information to said information-provision apparatus as information used for designating said second information reproduction apparatus to newly receive the second portion of said predetermined content data item and to reproduce the second portion of said predetermined content data item, said request to transmit said predetermined content data item to said second information reproduction apparatus specifying that said second information reproduction apparatus is to fade in its output; and an information receipt section for ending receipt of the content data item in response to a predetermined period of time having lapsed after a request to transmit said predetermined content data item to another information reproduction apparatus issued by said recipient designation section results in said information-provision apparatus stopping transmission of said predetermined content data item to said information reproduction apparatus.

11. At least one non-transitory computer storage medium having instructions encoded thereon which, when executed by a computer, perform a process to control operations of reproducing information provided by at least an information-provision apparatus in a plurality of information reproduction apparatuses each used for reproducing said information, said process comprising the steps of:

letting one of said information reproduction apparatuses request said information-provision apparatus to transmit a predetermined content data item to a first one of said information reproduction apparatus by transmitting pieces of information to said information-provision apparatus as content identification information used for identifying said predetermined content data item and apparatus identification information used for designating said first information reproduction apparatus as an information reproduction apparatus to receive said predetermined content data item transmitted by said information-provision apparatus, said predetermined content data item comprising first and second portions, the first portion being designated for reproduction prior to the second portion;

letting said information-provision apparatus transmit said predetermined content data item to said first information reproduction apparatus;

letting said first information reproduction apparatus reproduce said predetermined content data item;

letting said first information reproduction apparatus request said information-provision apparatus to transmit said predetermined content data item to a different information reproduction apparatus of said plurality of information reproduction apparatuses by transmitting apparatus identification information to said information-provision apparatus as information used for designating said different information reproduction apparatus as a second information reproduction apparatus to receive said predetermined content data item transmitted by said information-provision apparatus and to continue reproduction of said predetermined content data item, said request occurring as reproduction of the first portion of said predetermined content data item completes;

letting said information-provision apparatus start transmitting the second portion of said predetermined content data item to said second information reproduction apparatus;

letting said second information reproduction apparatus reproduce the second portion of said predetermined content data item in a continuation operation to reproduce said predetermined content data item; and ending an operation to transmit said content data item to said first information reproduction apparatus in response to a predetermined period of time having lapsed since a start of an operation to transmit said content data item to said second information reproduction apparatus.

* * * * *